(12) United States Patent
Shaffer

(10) Patent No.: US 9,642,299 B2
(45) Date of Patent: May 9, 2017

(54) GRANULAR FERTILIZER DISPENSER APPARATUS

(71) Applicant: Eric J. Shaffer, Clinton, MI (US)

(72) Inventor: Eric J. Shaffer, Clinton, MI (US)

(*) Notice: Subject to any disclaimer, the term of this patent is extended or adjusted under 35 U.S.C. 154(b) by 0 days.

(21) Appl. No.: 15/149,568

(22) Filed: May 9, 2016

(65) Prior Publication Data
US 2016/0278282 A1    Sep. 29, 2016

Related U.S. Application Data

(63) Continuation of application No. 14/460,544, filed on Aug. 15, 2014, now Pat. No. 9,363,944, which is a continuation-in-part of application No. 14/058,489, filed on Oct. 21, 2013, now abandoned.

(60) Provisional application No. 61/795,739, filed on Oct. 23, 2012.

(51) Int. Cl.
| | | |
|---|---|---|
| A01C 15/02 | (2006.01) | |
| A01C 15/16 | (2006.01) | |
| B65G 65/46 | (2006.01) | |
| A01C 19/04 | (2006.01) | |

(52) U.S. Cl.
CPC .............. *A01C 15/02* (2013.01); *A01C 15/16* (2013.01); *A01C 19/04* (2013.01); *B65G 65/46* (2013.01); *Y02P 60/214* (2015.11)

(58) Field of Classification Search
USPC ................................................. 222/413, 624
See application file for complete search history.

(56) References Cited

U.S. PATENT DOCUMENTS

| | | | |
|---|---|---|---|
| 915,661 A | | 3/1909 | Covington |
| 1,468,379 A | * | 9/1923 | Easton .................. B65G 33/00 |
| | | | 202/118 |
| 1,492,066 A | * | 4/1924 | Blue ...................... A01C 15/16 |
| | | | 74/350 |

(Continued)

FOREIGN PATENT DOCUMENTS

| | | | |
|---|---|---|---|
| FR | 2649586 A1 | 1/1991 | |
| GB | 629735 A * | 9/1949 | ............. A01C 15/16 |
| SU | 822781 A1 | 4/1981 | |

OTHER PUBLICATIONS

International Search Report, International Application No. PCT/US2013/065861, May 1, 2014.

*Primary Examiner* — Alicia Torres
(74) *Attorney, Agent, or Firm* — Young Basile Hanlon & MacFarlane, P.C.

(57) ABSTRACT

An apparatus for dispensing a granular fertilizer onto a surface. The apparatus comprises a housing, one or more wheels, a handle, and an auger. The housing has a first end, a second end, an enclosed tubular bore, a first opening facing generally upward, a second opening facing generally downward, and a weephole facing generally downward. The one or more wheels are connected to the housing for supporting the housing with respect to the surface. The handle is configured to be grasped by a user to cause movement of the housing relative to the surface. The auger is housed within the enclosed tubular bore. Rotation of the auger transports the granular fertilizer along the enclosed tubular bore of the housing from the first opening to the second opening to control an amount of the granular fertilizer that is dispensed from the second opening onto the surface.

19 Claims, 25 Drawing Sheets

(56) References Cited

U.S. PATENT DOCUMENTS

| | | | |
|---|---|---|---|
| 1,605,502 A * | 11/1926 | Blue | A01C 15/16 |
| | | | 159/4.03 |
| 1,668,516 A | 5/1928 | Litchfield | |
| 1,811,324 A * | 6/1931 | Lockard | E01C 23/098 |
| | | | 111/82 |
| 1,887,334 A | 11/1932 | Spaeth | |
| 1,891,565 A | 12/1932 | May et al. | |
| 2,242,227 A | 5/1941 | Blue | |
| 2,311,726 A | 2/1943 | Blue | |
| 2,493,599 A | 1/1950 | Schroeder | |
| 2,511,514 A * | 6/1950 | Rosselot | A01C 15/16 |
| | | | 222/310 |
| 2,840,275 A | 6/1958 | Liljenberg | |
| 3,074,822 A * | 1/1963 | Walk | B24C 1/003 |
| | | | 134/23 |
| 3,187,952 A | 6/1965 | Santarelli | |
| 3,270,879 A | 9/1966 | De Pauw | |
| 4,029,237 A | 6/1977 | Miconi | |
| 4,030,593 A * | 6/1977 | Deboffles | B65G 65/46 |
| | | | 198/308.1 |
| 4,635,818 A | 1/1987 | Glass | |
| 5,423,455 A | 6/1995 | Ricciardi et al. | |
| 5,800,116 A | 9/1998 | Smith et al. | |
| 5,842,648 A | 12/1998 | Havlovitz et al. | |
| 6,138,927 A | 10/2000 | Spear et al. | |
| 6,450,268 B1 | 9/2002 | Taylor | |
| 6,810,822 B1 | 11/2004 | Chan | |
| 2003/0062389 A1 | 4/2003 | Dopp et al. | |
| 2009/0014475 A1 | 1/2009 | Yapaola et al. | |
| 2011/0061989 A1 | 3/2011 | Thompson | |

\* cited by examiner

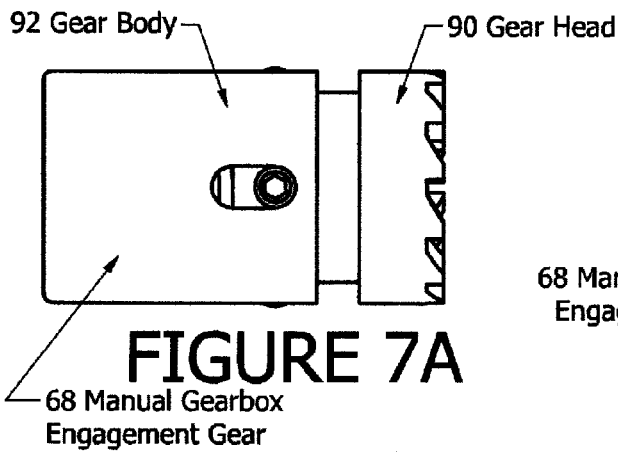
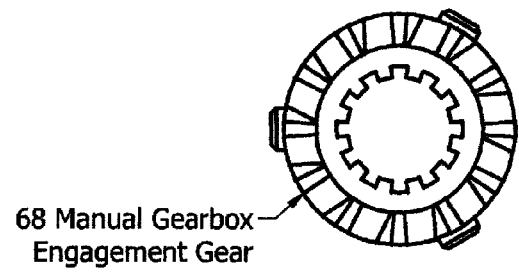
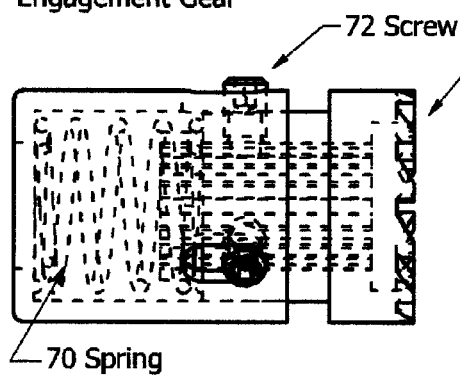
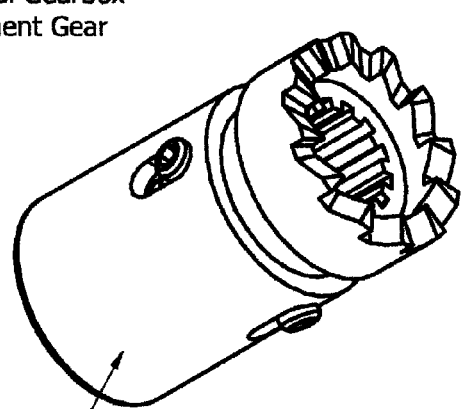
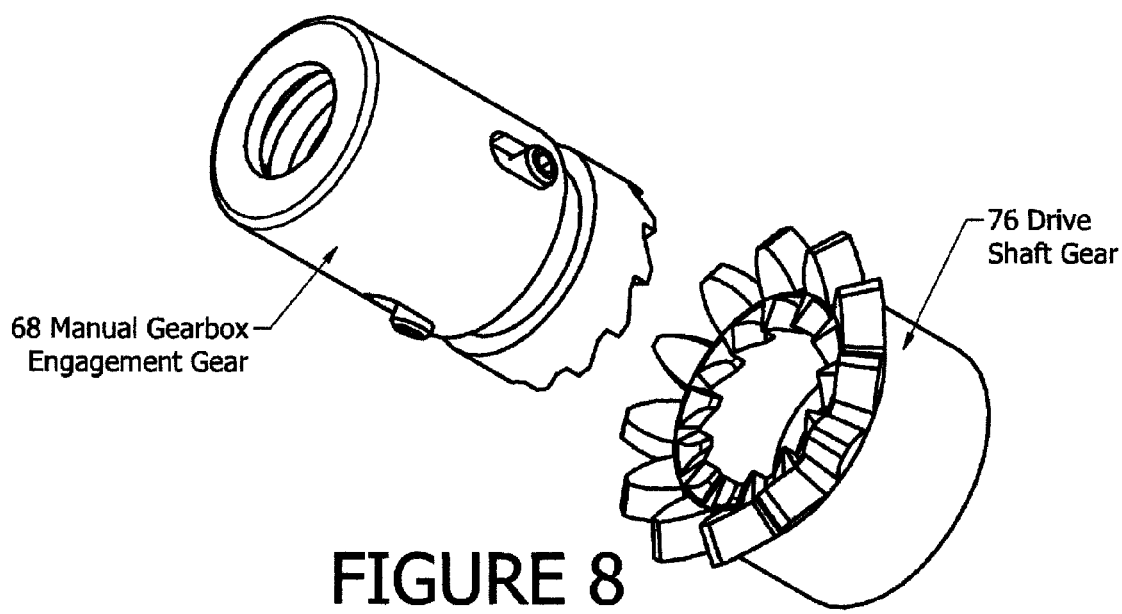

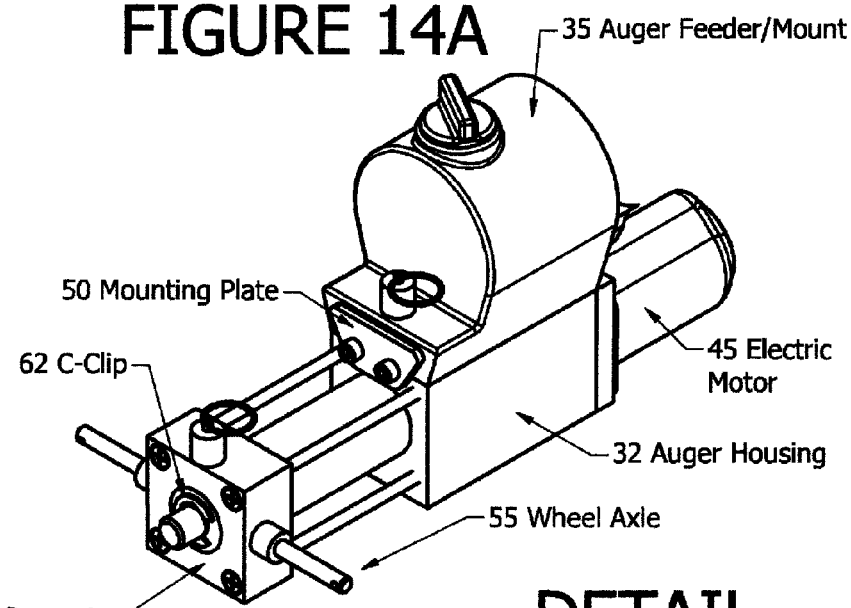
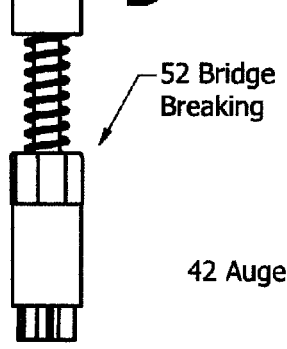
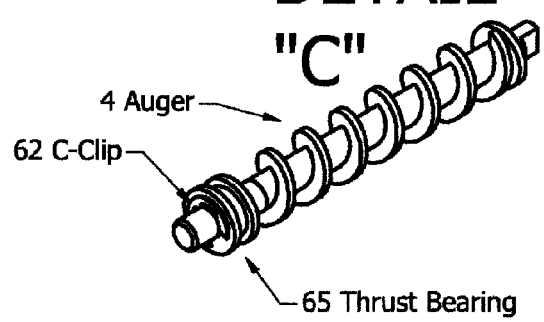
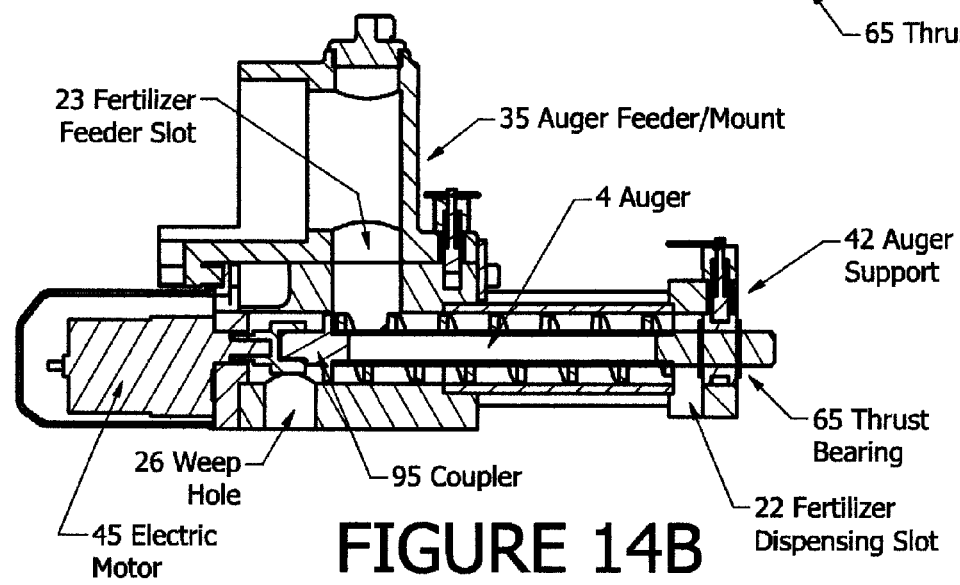

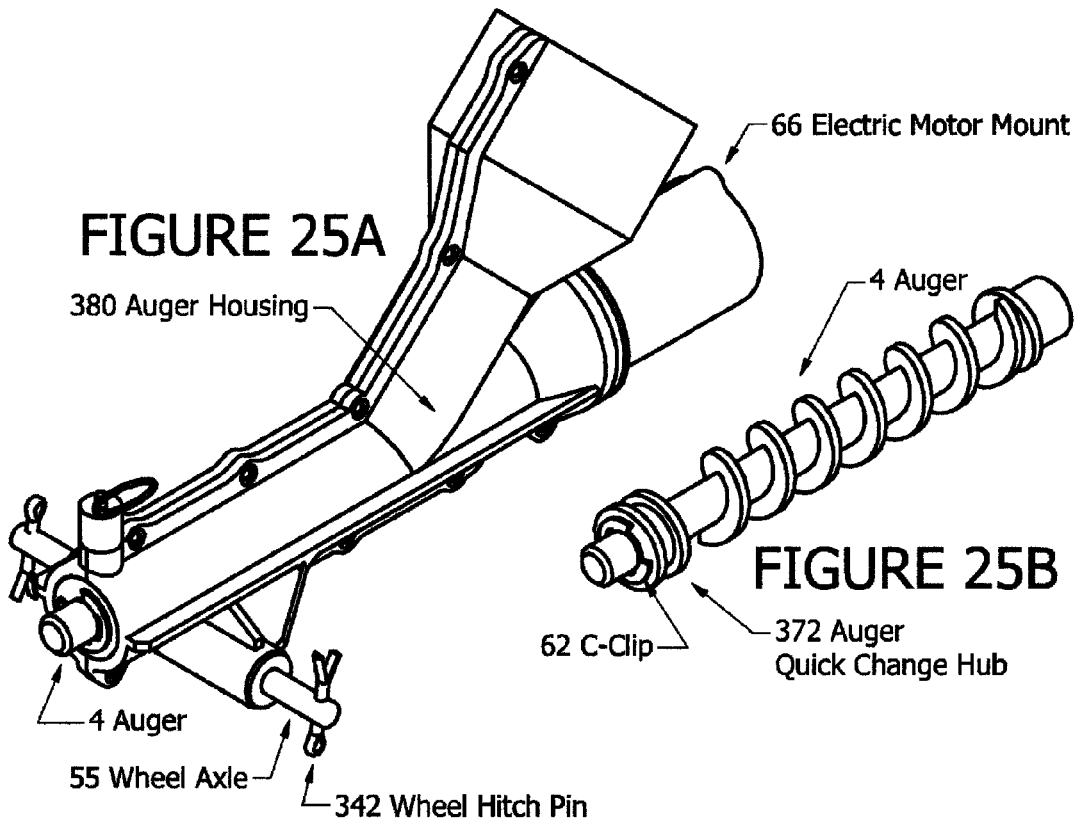
FIGURE 25A
FIGURE 25B
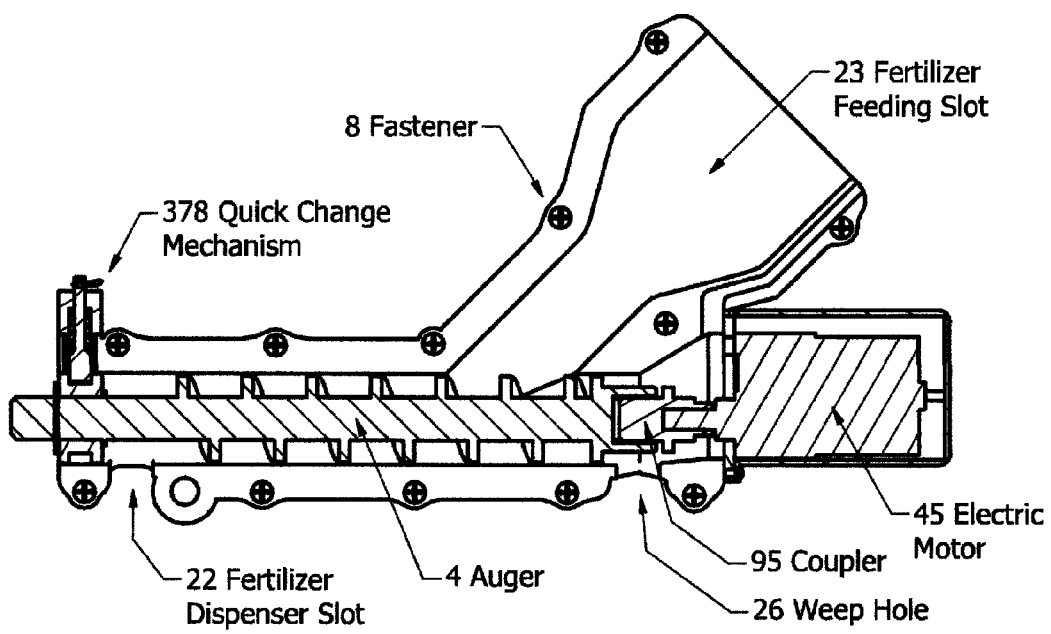
FIGURE 25C

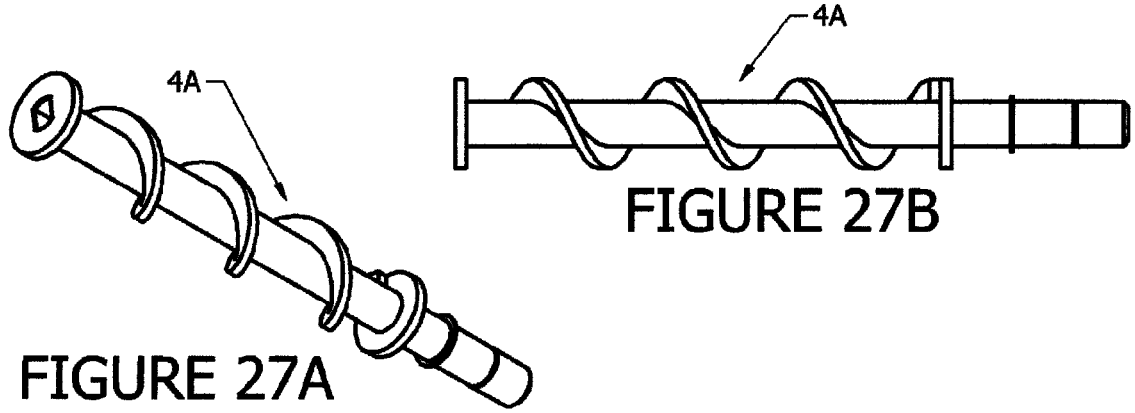
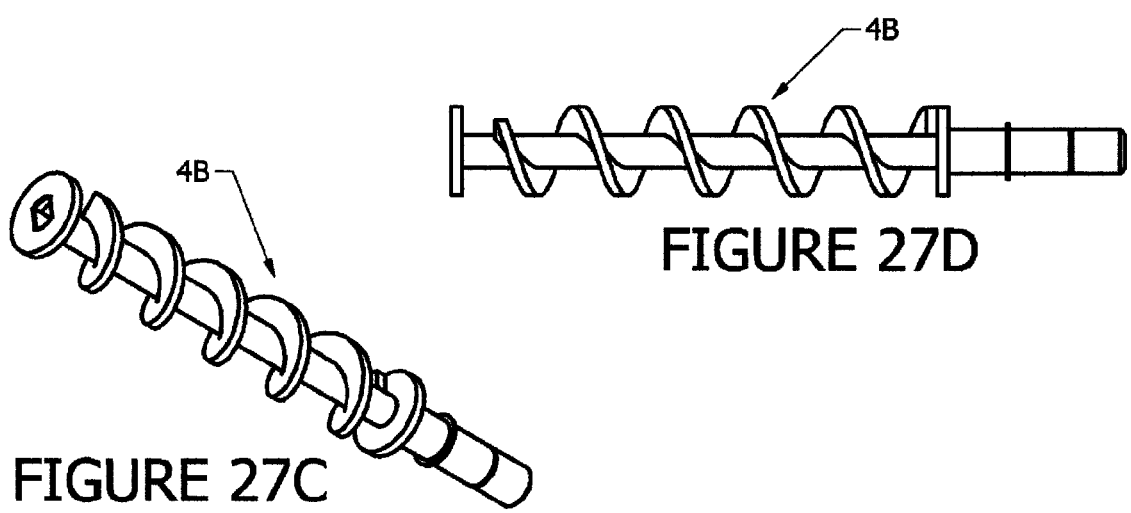
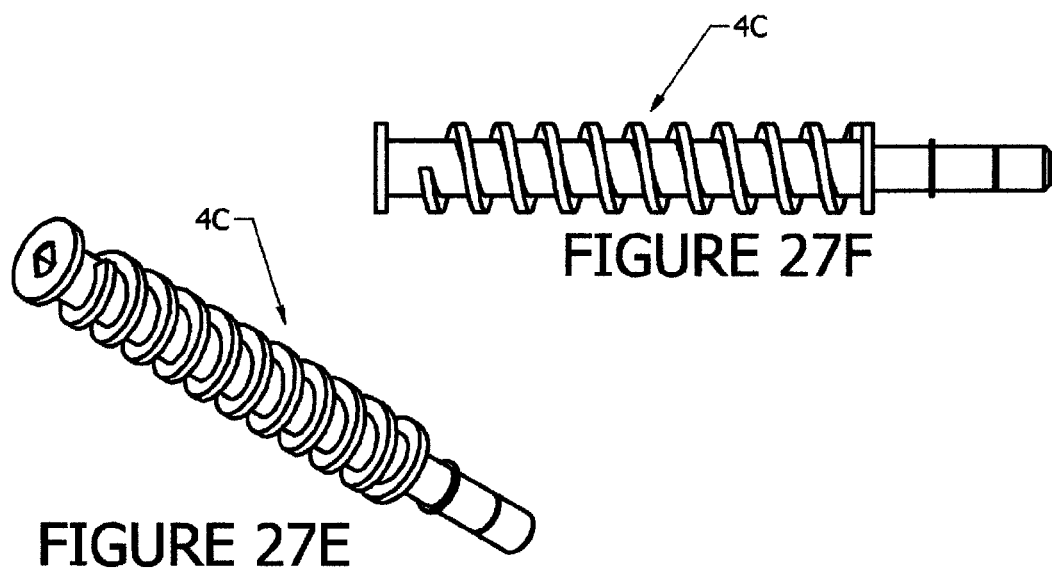
FIGURE 27A
FIGURE 27B
FIGURE 27C
FIGURE 27D
FIGURE 27E
FIGURE 27F

GRANULAR FERTILIZER DISPENSER APPARATUS

CROSS-REFERENCE TO RELATED APPLICATIONS

This patent application is a continuation of U.S. patent application Ser. No. 14/460,544, filed on Aug. 15, 2014, which is a Continuation-in-Part of U.S. patent application Ser. No. 14/058,489, filed on Oct. 21, 2013, which claims the benefit of U.S. Provisional Patent Application Ser. No. 61/795,739, filed on Oct. 23, 2012.

FIELD OF USE

The present invention relates to a portable granular fertilizer dispenser, typically used by home gardeners for accurately dispensing the granular fertilizer onto small areas, as well as preparing the soil surfaces prior to the application of the granular fertilizer and post application soil treatment.

BACKGROUND OF THE INVENTION

In addition, blooms which have long been a concern of environmentalists are the result of the excessive growth of algae in lake areas and streams with high amounts of nitrogen and phosphorus. These chemicals are often the runoff of over-fertilized fields and lawns are a danger to our water supply.

Prior approaches to fertilizer dispensing have been large, stand along push dispensers, or tractor attachments, or attachments for lawn mowers, which dispense massive amounts of fertilizer over a large area. Even smaller, portable units tend towards the volume method of fertilizer dispensation and have no means to prepare the soil prior to the application of fertilizer, as well as no means of post application soil finishing. This wasted, unused fertilizer is harmful to the environment.

Some of the prior art includes the following:
a. U.S. Patent Document 20130068861 (Zwahlen; et al) discloses a portable scattering apparatus for storing and dispensing granular material, especially pourable bulk material on a surface, e.g. of grainy fertilizer on a lawn surface, or scattering material on slick roads or paths. The scattering apparatus contains a closable container and a handle part connected to the container for dispensing the granular material. The handle part comprises a lock chamber in the connecting region of the container for controlling the flow rate, and it is shaped into a distributor at the front end. A valve is arranged in the lock chamber, which valve can be actuated via a lever, which is pivotably held on the outside on the handle part. The lever is connected via a valve stem with the valve disk of the valve.
b. U.S. Patent Document No. 20070289511 (Chen; et al.) discloses a method for cutting sub-surface cavities into a region of soil and for delivering liquid fertilizer directly to each cavity while minimizing overflow or spillage of liquid fertilizer onto the surrounding surface soil. A cutting apparatus is described for creating sub-surface cavities the soil, each cavity is associated with an opening at the soil surface through which liquid fertilizer can be delivered to the cavity. A system for delivery of liquid fertilizer to the cavities is described, which includes a fertilizer dispenser including a metering valve assembly for delivery of liquid fertilizer to each cavity. A synchronization system may be incorporated into the system for locating each cavity and directing the dispensing of liquid fertilizer.
c. U.S. Pat. No. 7,281,675 (Elrod; et al.) discloses a portable, user shoulder supported spreader/blower unit includes an ergonomically configured housing which includes a section defining a storage bin for holding a quantity of salt or like chemical particulate material for spreading onto ground surfaces to prevent icing thereon in winter. A centrifugal distributor disk is located in a housing space section below the bin and, a bin discharge aperture aligns over a peripheral area of the distributor disk. A user controllable closure member selectively alters bin discharge aperture size and, hence, outflow quantity from the bin onto the distributor disk, the distributor disk rotating at high speed propelling particulate material out of the housing through a discharge nozzle thereon at a high speed.
d. U.S. Pat. No. 6,729,557 (Dillon) discloses a portable particulate spreader comprising a container having a closed end, an open end and a storage chamber for holding particulate matter therein is disclosed. A first handle is attached to a side of the container proximate the closed end. A second handle is attached, preferably pivotally, to the same side, approximately midway between the closed end and the open end, allowing a person to conveniently grasp the spreader in either a vertical position for carrying or a horizontal position for use. An impeller at the open end disperses the particulate outwardly and downwardly from the spreader.
e. U.S. Pat. No. 5,944,264 (Truax; et. al.) discloses a portable seed spreader for distribution of bulky and irregular size seeds over a local area. The spreader includes a U-shaped frame that carries a housing having a first seed bin and a second seed bin. A first transverse shaft is mounted to legs of the frame and extends through the first seed bin. The first shaft carries agitators for mixing and stirring the seeds in the first seed bin. Discharge slots are located in a bottom wall of the first seed bin. A second transverse shaft is mounted on the frame and extends beneath the bottom wall of the first seed bin. The second transverse shaft carries picker wheels that extend through the discharge slots into the first seed bin to pick seeds therefrom and draw them through the discharge slot. The shafts are connected so that rotation of one transverse shaft as by a hand crank, an electric motor or a wheeled mechanism, results in rotation of the other.
f. U.S. Pat. No. 2,493,599 (Schroeder) discloses a single row fertilizer applicator where the flow of fertilizer leaving the hopper is steady and reliably constant but under operator control. The applicator has no means to prepare the soil prior to the application of fertilizer, as well as no means of post application soil finishing. Furthermore, the applicator lacks the ability to accurately meter for dispensing the rate of the fertilizer, resulting in the use of excessive fertilizer.

Conventional prior art fertilizer dispensers require the proper application of fertilizer to be applied in three distinct steps needed in order to achieve effective feed the targeted plants.
a. (1) Coarsen the ground prior to applying the fertilizer by tilling, hoeing, raking, or some other suitable means of breaking up the surface of the soil.
b. (2) Apply the granular fertilizer.

c. (3) Work the newly applied granular fertilizer into the surface area and to coarsen the ground.

What is needed is a granular fertilizer dispensing apparatus that will perform all three tasks to optimize fertilizer utilization and reduce costs, time and effort, as well as being environmentally green and to reduce costs, time and labor.

The primary object of the fertilizer drop dispenser is to enable a user to apply a specified amount of fertilizer to a given area, instead of over large areas where fertilizer might not be needed. Also, the less fertilizer that is used, results in more saving on waste and cost.

The primary objective of the fertilizer drop dispenser is to enable a user to target individual plants for the most efficient application of granular fertilizer, instead of bulk dispensing over large areas where fertilizer may not be needed. Furthermore, less fertilizer is used in addition to reduced time of preparing the soil, resulting in saving on waste, cost, and time and less fertilizer introduced into the environment.

What is needed is a device that prepares the soil prior to the application of fertilizer, as well as post application soil finishing; a device that will target the base of the individual plant, conserving the fertilizer to sites where it is needed while avoiding dispensing said fertilizer in a wasteful manner, where said excess fertilizer is damaging and harmful to the environment.

What is needed is a device to save fertilizer, to enable a user to control a dosage of fertilizer dispensed at any time to any location, a device that is portable, and easy to operate, that will enable the user to operate easily, and efficiently measuring the amounts of fertilizer being applied to preselected areas, replacing large, space consuming, volume spreaders which cannot supply metered amounts of fertilizer to small areas.

What is needed is a device that will prepare the soil surface prior to the application of granular fertilizer, and enable the user to control the dosage of fertilizer at any time to any location, a device that is portable, easy to operate, and accurately measure the amount of fertilizer being dispensed to pre-selected areas as well as post application soil finishing. The soil finishing is necessary in urea based fertilizers to prevent volatilization. Small spreaders shown in the prior art incapable of pre-application soil treatment and do not afford the ability of post application soil finishing.

SUMMARY OF THE INVENTION

The fertilizer dispenser apparatus of the present invention addresses these objectives and these needs.

Granular fertilizer, as used herein, is any organic or inorganic granular or solid particulate material of natural or synthetic origin that is added to a soil to improve the quality or quantity of plant growth.

The fertilizer dispenser apparatus is for use over a surface area to be treated. The apparatus comprises a main body for storing the fertilizer, a rolling mechanism affixed to the main body, and a control mechanism cooperatively engaged with the main body.

The rolling mechanism disrupts the surface to be treated as the fertilizer dispenser apparatus rolls over the surface area to be treated.

The control mechanism enables the user to control the amount of fertilizer dispensed over any part of the surface area to be treated. The control mechanism enables the user to pinpoint an exact location where the dosage of fertilizer is dispensed.

The control mechanism is cooperatively engaged with the main body, the control mechanism enables the user to control a dosage of fertilizer dispensed over the surface area to be treated, The control mechanism is cooperatively engaged with the main body, the control mechanism enables the user to control a location where the dosage of fertilizer is dispensed over the surface area to be treated. The control mechanism may include a meter which shows the user the amount or volume of fertilizer being used in each dose and the total amount of fertilizer used.

Once the surface of which fertilizer is to be applied is coarsened, via a back and forth motion of the present invention, the operator need only to depress the trigger or control mechanism to dispense a specific amount to the area to be fertilized.

The longer the trigger is held, the more fertilizer is dispensed. While the fertilizer is being dispensed, the unit is moved in a manner so as to fertilize the area desired. After the proper dosage of fertilizer has been applied, the apparatus of the present invention is manipulated in a similar back and forth motion that was previously performed to coarsen the surface, whereby fertilizer is worked into the ground reducing volatilization.

In another embodiment, the preferred embodiment of the present invention includes a receptacle for attachment of a grounded extension cord.

In a yet another embodiment of the present invention, a power cord is attached with a grounded extension cord plug.

In still another embodiment of the present invention, the apparatus is manually driven via a gear box attached to the front of the screw housing, which is driven by the motioned generated when the wheels turn in either the forward or backward direction with the trigger actuating an engagement mechanism inside of the gear box, allowing fertilizing agent to be metered out according to the users wishes.

Another embodiment will eliminate the trigger housing and, instead, have an attachment point for a drive mechanism, such as a cordless drill, which will be used in lieu of the trigger assembly. The drive mechanism will be connected to the dispensing mechanism via a drive shaft which will replace the electric drive motor.

The gear housing where the metering auger is housed includes a quick detach coupling so as to enable different augers with differing pitches to be used so as to change the amount of fertilizer deposited while the trigger is being depressed.

For a complete understanding of the granular fertilizer dispensing apparatus of the present invention, reference is made to the following summary of the invention detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

BRIEF DESCRIPTION OF THE DRAWINGS

FIGS. 7A, 7B, 7C, and 7D depict various views and details of the manual gearbox engagement gear of FIGS. 6A and 6B.

FIG. 8 depicts the drive shaft gear engagement with the manual gearbox engagement gear of FIG. 7D, the engaging gear located in the manual gear box which engages the auger to dispense fertilizing agent of the granular fertilizer dispensing apparatus of FIG. 1.

FIG. 14A depicts the auger feeder/mount, and FIG. 14B depicts a sectional view of the auger feeder/mount, with DETAIL "B" depicting an exploded view of the bridge breaker assembly and DETAIL "C" depicting an assembled view of the auger assembly for the power-operated granular fertilizer dispensing apparatus of FIG. 9.

FIG. 25A depicts the auger housing of the sixth embodiment of the battery powered granular fertilizer dispensing apparatus of the present invention.

FIG. 25B depicts the auger of the sixth embodiment of the granular fertilizer dispensing apparatus of the present invention, this apparatus being powered via battery.

FIG. 25C depicts a cutaway of the sixth embodiment of the granular fertilizer dispensing apparatus of the present invention, this apparatus being powered via battery.

FIGS. 27A and 27B, 27C and 27D, and 27E and 27F depict three augers having varying pitch.

DETAILED DESCRIPTION OF THE PREFERRED EMBODIMENTS

Figure 1:
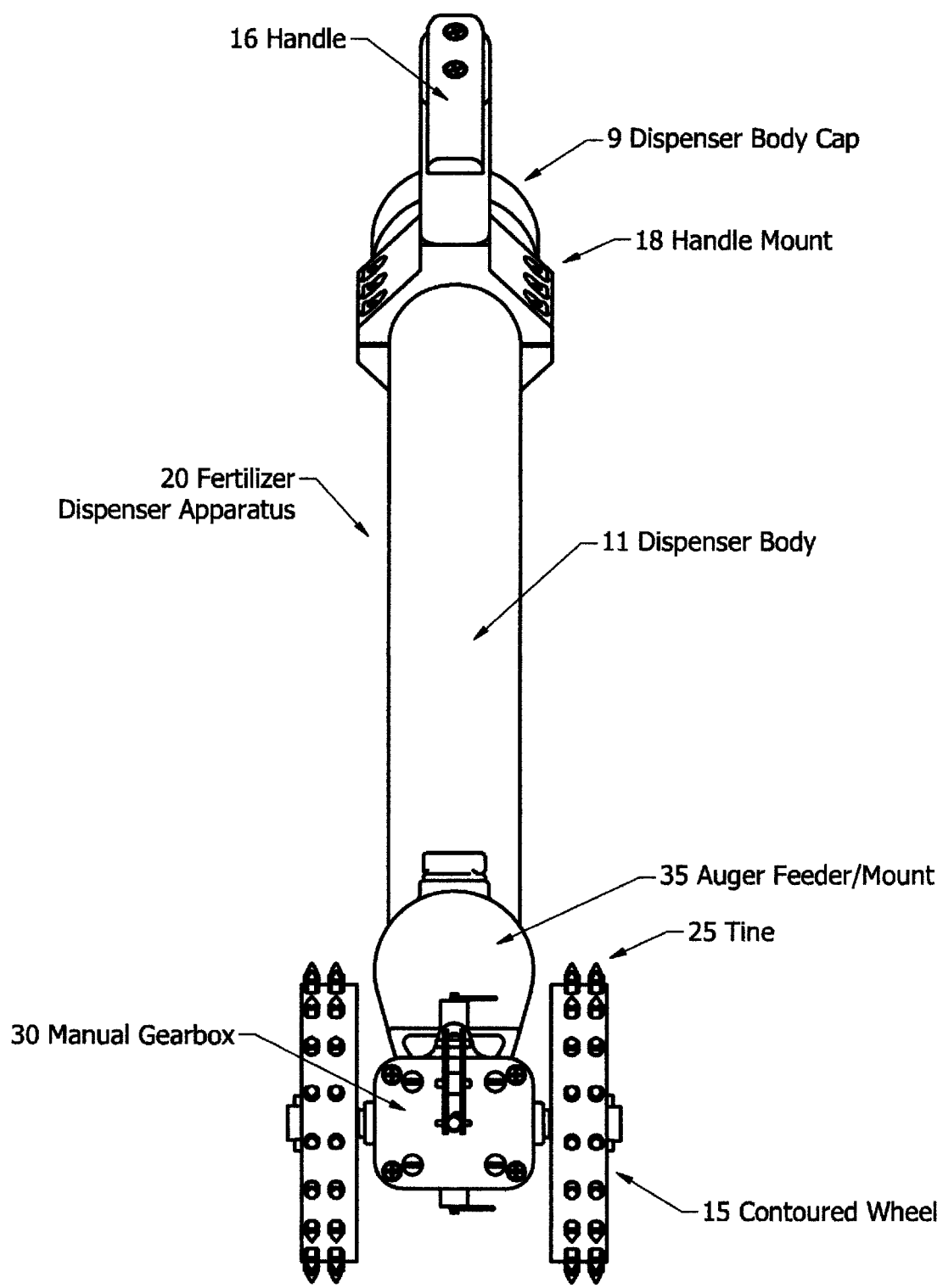
FIG. 1 depicts the front view of the first preferred embodiment of the granular fertilizer dispensing apparatus of the present invention.
Figure 2:
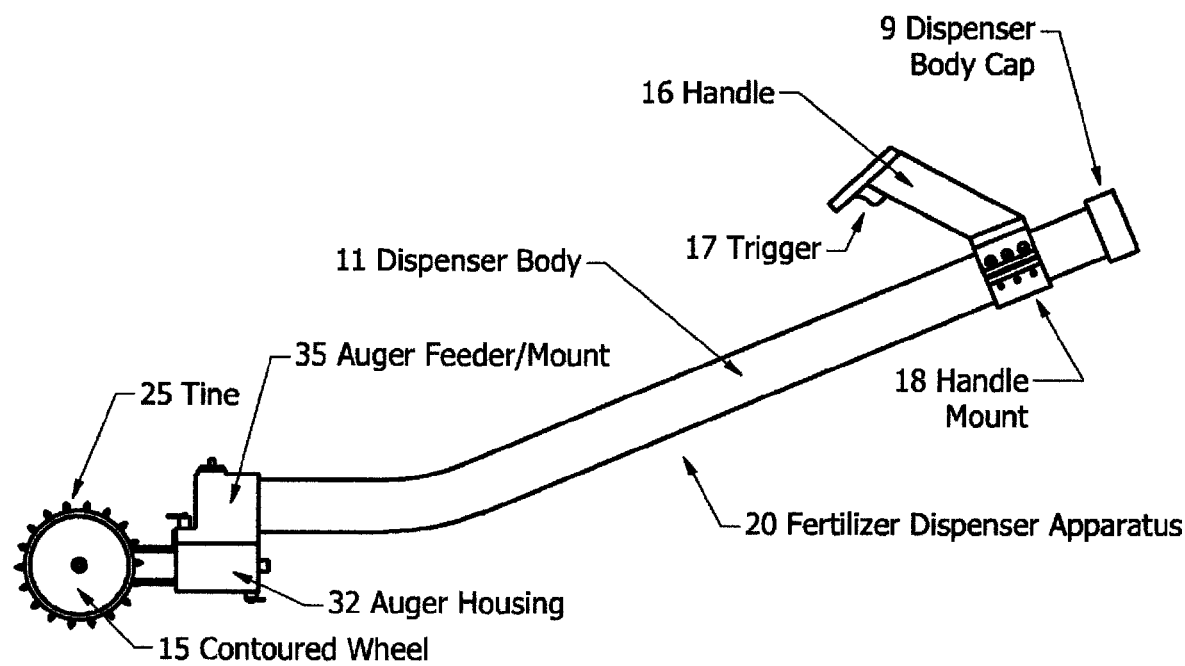
FIG. 2 depicts the side view of the first preferred embodiment of the granular fertilizer drop dispensing apparatus of FIG. 1.
Figure 5:
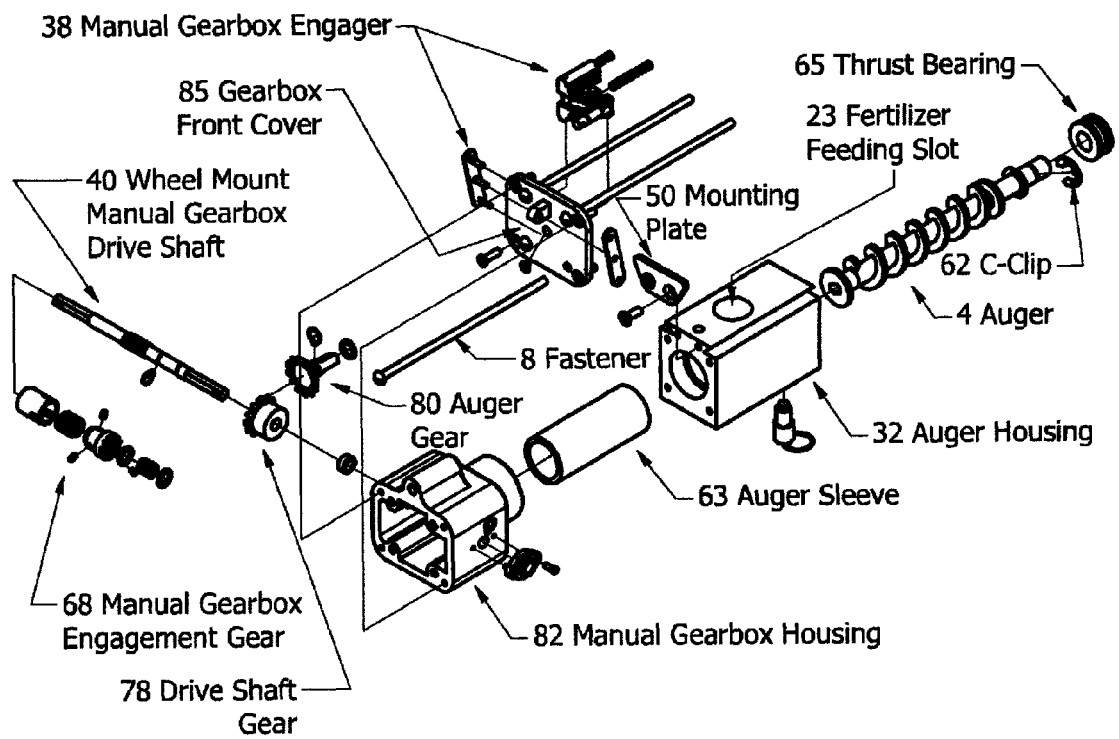
FIG. 5 depicts an assembly view of the of the auger housing and manual gearbox of the granular fertilizer dispensing apparatus of FIG. 1.

Referring now to the drawings, FIGS. 1 and 2 depict the preferred embodiment of the manual fertilizer dispensing apparatus 20 of the present invention. Attached to the top of the dispenser body 11 is the handle 16 with trigger 17 which enables the user to operate fertilizer dispensing apparatus 20 of the present invention. Attaching the handle 16 to the dispenser body 11 is a handle mount 18 which is a compression style mount attached via fasteners. At the base of the dispenser body is the auger/feeder mount 35 which is attached to the fertilizer dispensing apparatus 20 and houses the auger 4 (FIG. 5). The contoured wheels 15 are attached to the auger housing 32 via a wheel mount/manual gearbox drive shaft 40 (as best depicted in FIG. 5), which are used for mobility, as well as to coarsen the ground prior to dispensing of the fertilizer.

Figure 3:
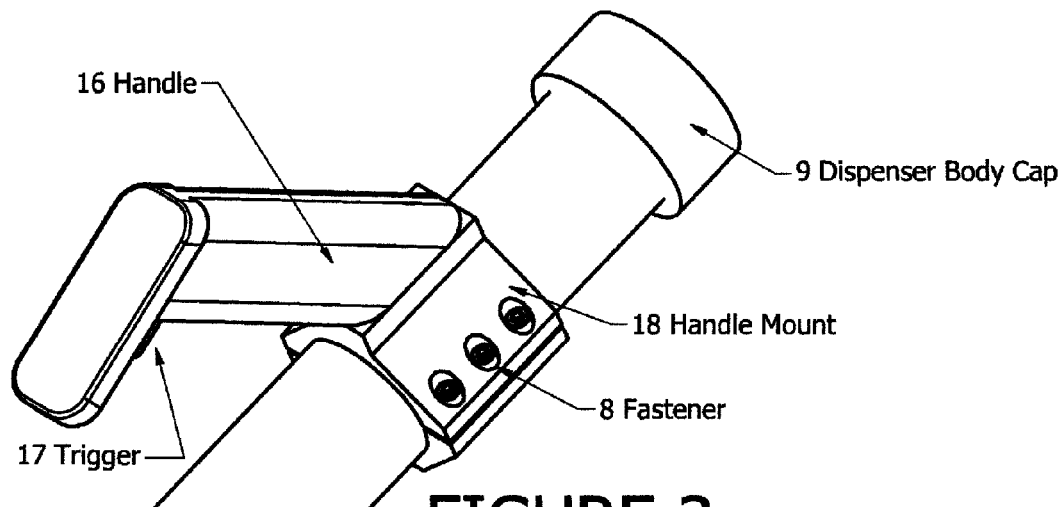
FIG. 3 depicts a perspective view of the handle and trigger assembly of the granular fertilizer dispensing apparatus of FIG. 1.
Figure 4:
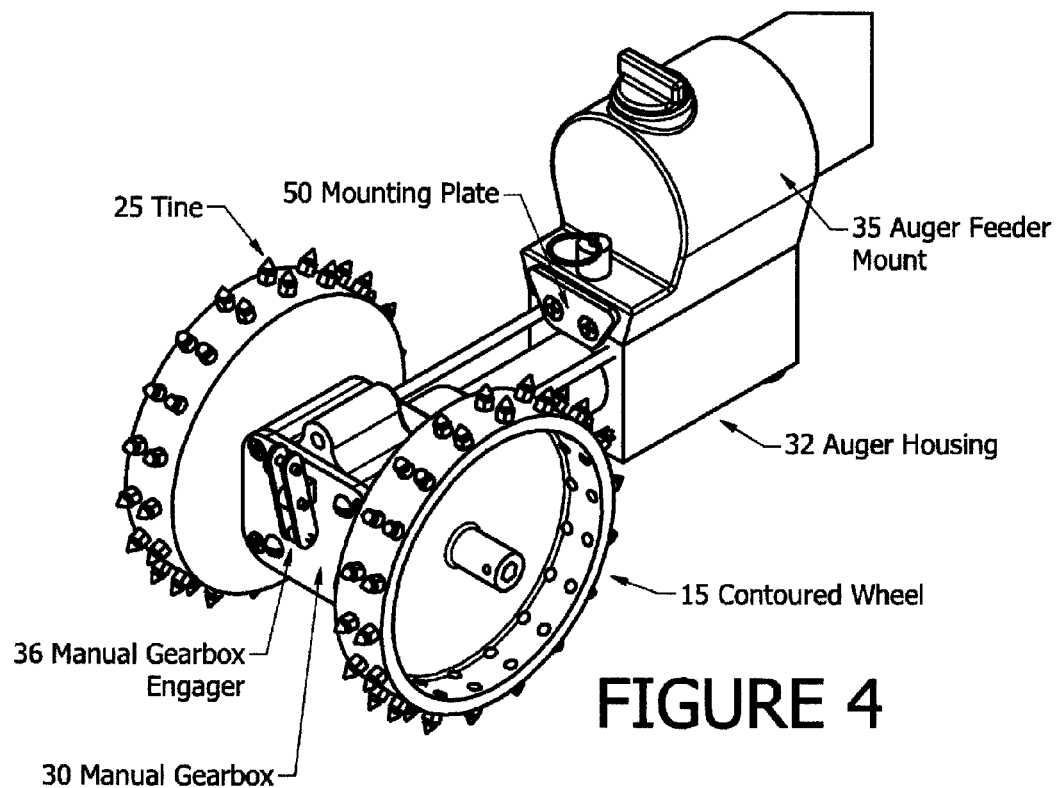
FIG. 4 depicts a perspective view of the auger housing, manual gearbox and the contoured wheel assembly, the manual gear box assembly attached to the auger which dispenses the granular fertilizer of the preferred embodiment of the granular fertilizer dispensing apparatus of FIG. 1.

FIGS. 3-4 depicts an isometric view of the manual embodiment of the present invention in which the manual gearbox 30 with attached contoured wheels 15 and the handle 16, and handle mount are visibly attached to the dispenser body 11 via a wheel mount/manual gearbox drive shaft 40 (as best depicted in FIG. 5) with the dispenser cap 9 attached to the dispenser body 11 just above the handle 16.

FIG. 4 depicts the auger housing 32 attached to the front end of the manual gearbox 30 which is operated via the forward and rearward motion of the contoured wheels 15. A plurality of tines 25 extends radially about each contoured wheel 15. The tines 25 are generally equally spaced about the circumference of each wheel 15. The purpose of the tines 25 is to coarsen or break up the surface crust of the area being fertilized. The tines 25 extends radially about each contoured wheel 15. The tines 25 are generally equally spaced about the circumference of each wheel 15. The purpose of the tines 25 is to coarsen or break up the surface crust of the area being fertilized.

As the surface is being dispersed, the trigger 17 is engaged and a metering auger dispenses a controlled amount of fertilizer. The surface treatment enables the fertilizer to be inserted into the soil close to the root system of the plants targeted for growth, rather than fertilizing the weed system surrounding the plants which may eventually threaten the plants. After the fertilizer is inserted, the fertilizer dispenser apparatus in maneuvered in a fashion to cover the newly applied fertilizer with available soil that was previously dug up. Also, the surface treatment results in less handling of the fertilizer and a reduction in the overall amount of fertilizer needed in the area of the plant system.

FIG. 5 depicts a detailed assembly view of the manual gear box 30 and the auger housing 32 of the fertilizer dispensing apparatus of FIG. 1. Inside the manual gearbox 30 is the wheel mount/drive shaft 40 up which the engagement gear 68 is mounted which engages the drive shaft gear 78, which meshes with auger gear 80, which turns the auger 4, dispensing fertilizer. Locating the auger 4 in the auger housing 32 is a thrust bearing 65 and a pair of C-clips 62. The manual gearbox 30 is attached to the end of the assembly by four fasteners with the auger 4 being positioned inside an auger sleeve 63. Forward and rearward motion of the wheels 15 turns the gearbox 30 and when the trigger 17 is pulled, the gear box engager 38 engages the gears, turning the auger 4 and dispensing a metered amount of fertilizing agent.

Figure 6A:
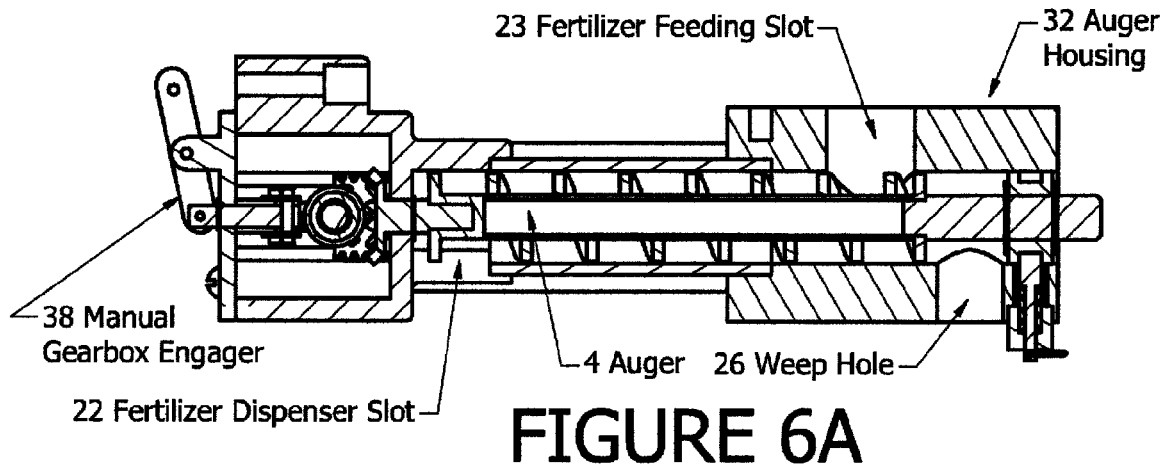
FIG. 6A is a half-section the auger housing and manual gearbox of FIG. 6B.
Figure 6B:
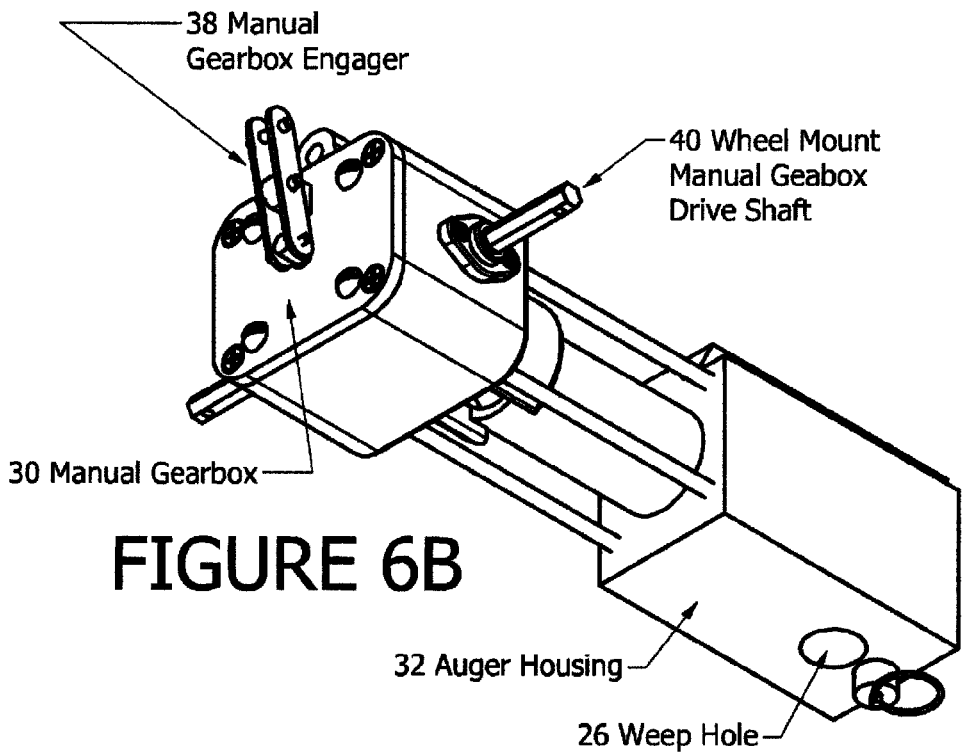
FIG. 6B depicts a perspective view of the auger housing and manual gearbox of FIG. 4 of the granular fertilizer dispensing apparatus of the present invention.

FIGS. 6A and 6B depict the manual gearbox 30 attached to the auger housing 32. FIG. 6A is a cutaway view and FIG. 6B is an isometric view of the preferred embodiment of the assembly. A drive shaft 40 is mounted inside the manual gearbox 30, which the wheels 15 are mounted to and when a rotational force is applied to them, the driveshaft 40 turns, which in turn turns the auger 4, dispensing fertilizing agent. The cutaway view shows the auger 4 and manual gear box 30. Fertilizer is loaded into the fertilizer dispenser apparatus of the present invention 20 through a fertilizer feeding slot 23 disposed in the top of the auger housing 32. A weep hole 26 is disposed on the underside of the auger housing 32. The weep hole 26 is preferably positioned slightly upstream of fertilizer feeding slot 23 and is designed to drain off accumulated material from the auger 4. The fertilizer dispensing slot is located downstream of the auger 4 and is positioned on the underside of the manual gearbox 30.

Referring now to FIGS. 7A, 7B, 7C, and 7D, when the operator pulls the trigger 17, the manual gearbox engager 38 engages the engagement gear 68, which in turn engages the driveshaft gear 78 of FIG. 8, and turns the auger 4, through the fertilizing dispensing slot 22 located on the underside of the manual gearbox 30. The manual gearbox engagement gear 68 depicted in includes an internal spring 70 which aides in the seating and engagement of the gear during operation. In the body of the engagement gear 68 are a plurality of screws 72, which secure the gear head 90 to the gear body 92.

Figure 9:
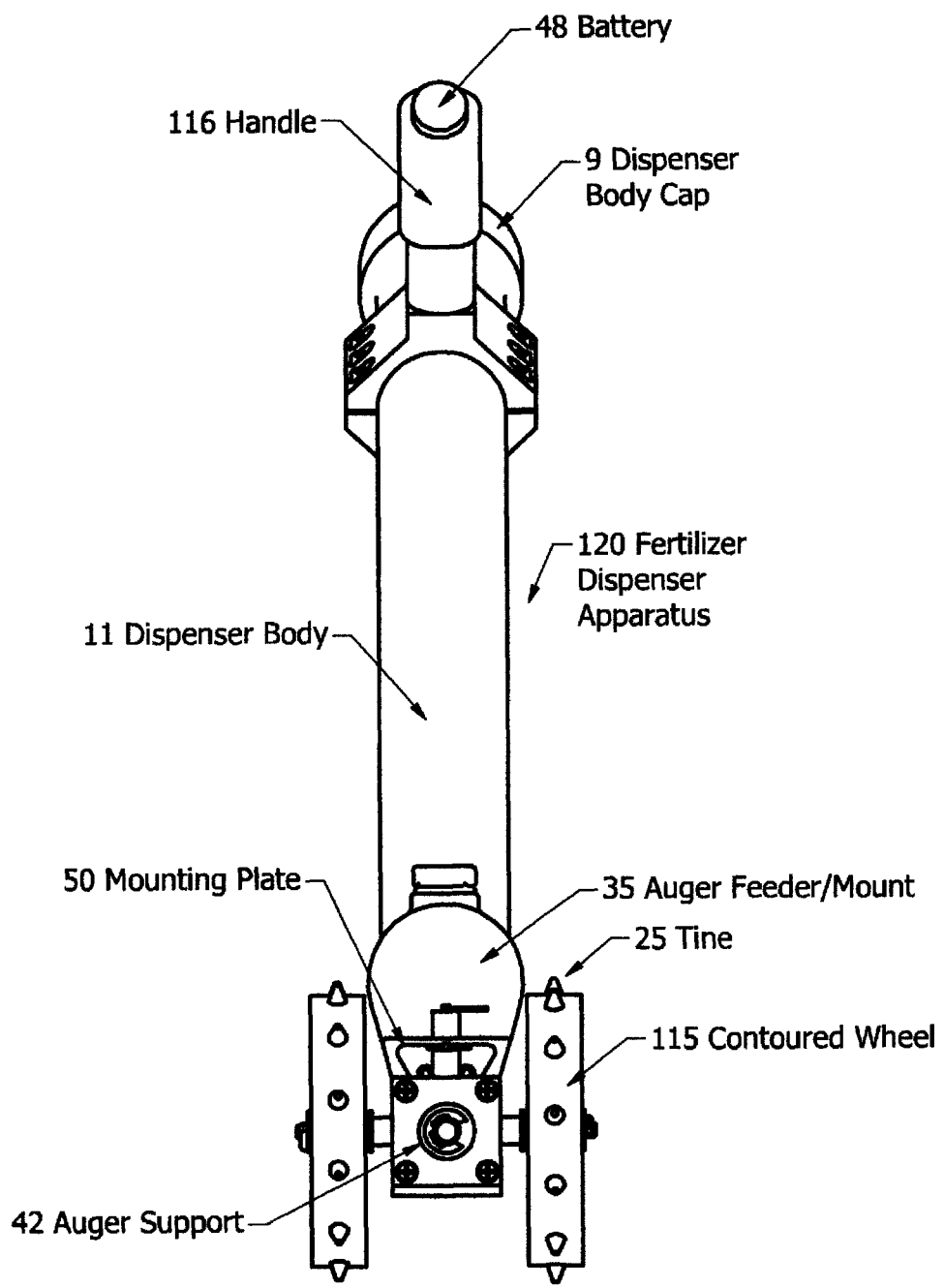
FIG. 9 depicts the front view of a second preferred embodiment of granular fertilizer dispensing apparatus, said apparatus deploying an electric motor and a rechargeable battery.
Figure 10:
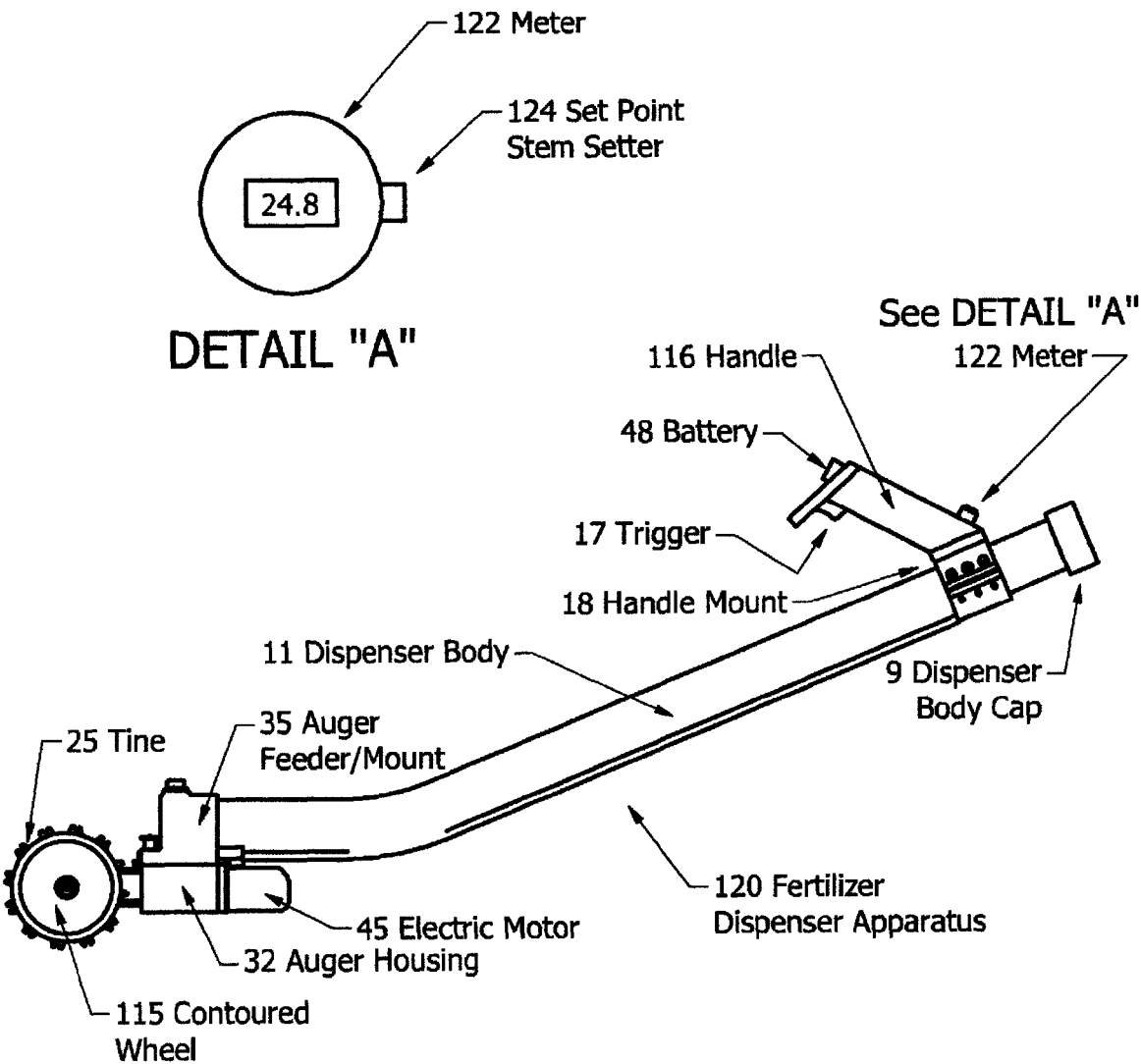
FIG. 10 depicts the side view of the power-operated granular fertilizer dispensing apparatus of FIG. 9, said apparatus using a rechargeable battery.
Figure 11:
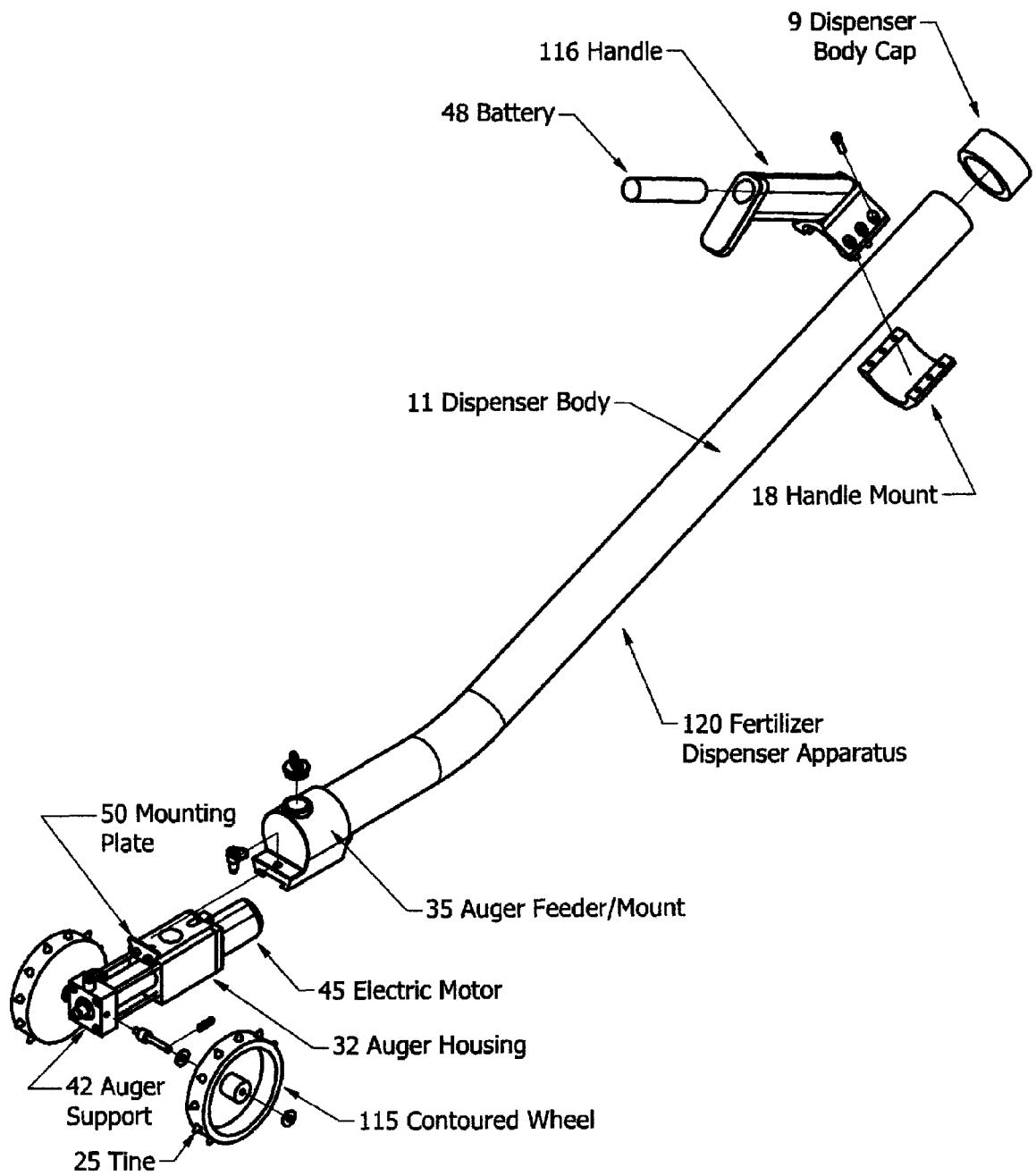
FIG. 11 depicts an assembly view of the power-operated granular fertilizer dispensing apparatus of FIG. 9.

FIGS. 9 and 10 depict the front and profile view of the power version of the fertilizer dispensing apparatus 120 of the present invention, and FIG. 11 is an assembly view of the power version of the fertilizer dispensing apparatus 120. The auger housing 32 which is mounted to the auger feeder/mount 35 is shown, which is mounted to the end of the dispenser body 11. Mounted to the front of the auger housing 32 is the auger support 42 which is used to locate the auger 4 as well as being a mounting point for the wheels 115. At the opposite end of the dispenser body 11 is the handle 116, which is mounted to a compression fit mount 18 via six fasteners. A rechargeable battery 48 is positioned inside the handle 116. The rechargeable battery 48 is used to actuate the electric motor 45 which is mounted to the rear of the auger housing 32. The dispenser body cap 9 is positioned just behind the handle 116 and is used for loading the fertilizer into the fertilizer dispensing apparatus 120 of the present invention.

The meter 122 depicted in FIG. 10 is positioned in the handle 116 of the fertilizer dispensing apparatus 120 of the present invention. The meter 122 is preferably either a volume flow meter or a mass flow meter. The control mechanism 17 is cooperatively engaged with a main body 11. The control mechanism 17 is also cooperatively engaged with the meter 122. The meter 122 is a mass or volume flow meter displaying a dosage of fertilizer being dispensed. The user pinpoints a location where said dosage of fertilizer is to be dispensed by positioning said fertilizer dispensing apparatus 120. The user uses the set point stem setter to advise the apparatus the dosage of fertilizer to be dispensed to the location selected. The control mechanism 17 and the flow meter 122 enable the user to control the dosage of fertilizer dispensed. In addition, the user can view the granular fertilizer being dispensed onto the targeted areas as he walks behind and pushes the granular fertilizer dispenser apparatus of the present invention.

Figure 12:
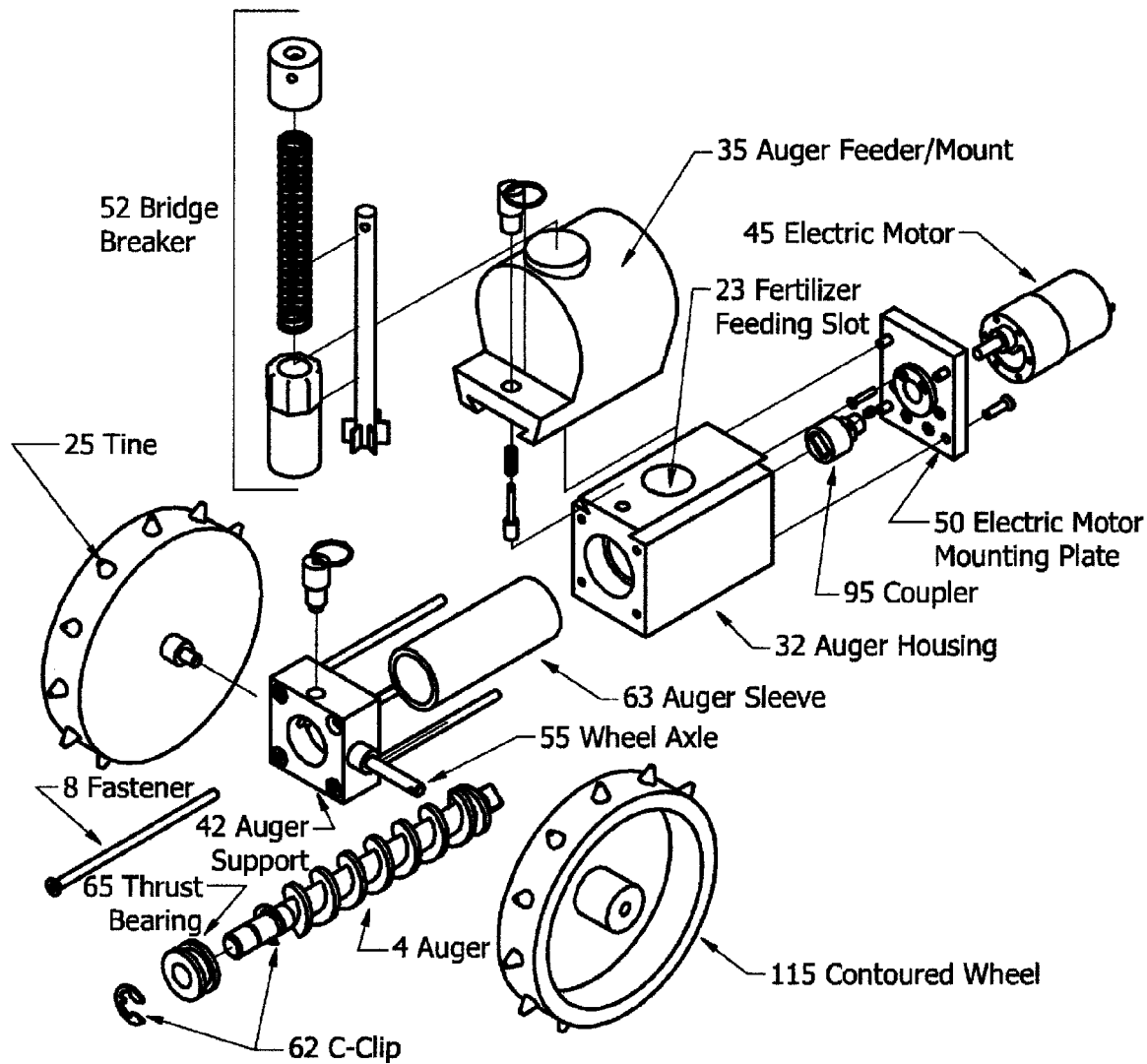
FIG. 12 depicts an exploded assembly view of the auger feeder, bridge breaker, and the electric motor of the power-operated granular fertilizer dispensing apparatus of FIG. 9.
Figure 13:
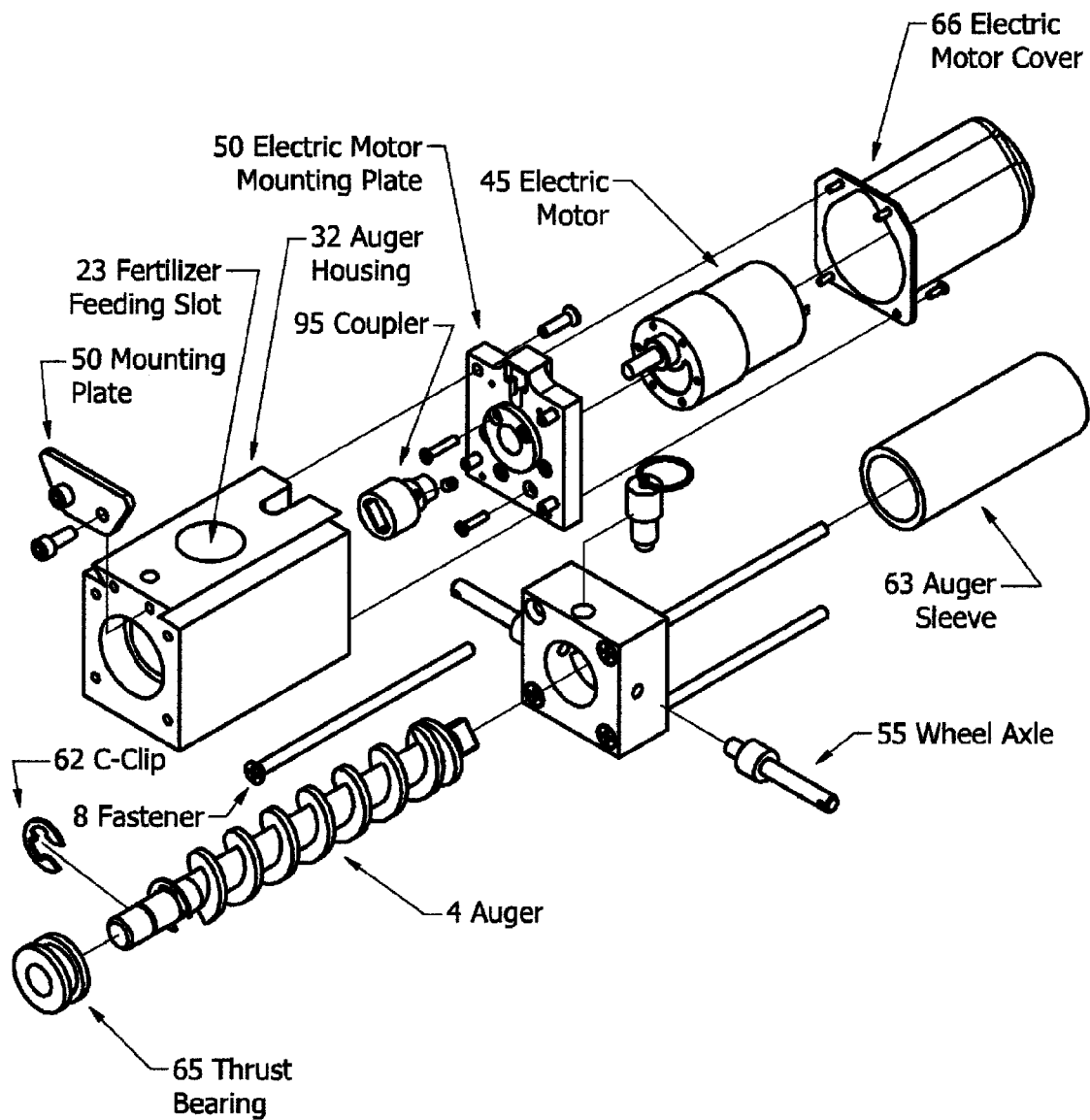
FIG. 13 depicts an exploded assembly view of the auger assembly as it would be attached to the auger housing of the granular fertilizer dispensing apparatus of FIG. 9.

FIGS. 12 and 13 depict the assembly view of the auger housing 32 auger support 42, wheels 115, electric motor 45, electric motor mount 50, and auger feeder/mount 35 of the fertilizer dispensing apparatus 120 of the present invention. The electric motor 45 is mounted to the back of the auger housing 32 via the electric motor mount 50, with the auger housing 32 being attached to the auger feeder/mount 35, which is, in turn, attached to the dispenser body 11. The wheels 115 are attached to two wheel axles 55 which are attached to the auger support 42. The auger 4 is supported by the auger support 42 and positioned via thrust bearing 65 and C-clips 62. The auger/feeder mount 35 is disposed in the bridge breaker 52 (see DETAIL "B") which is used to break up any chunks of fertilizer or other material which may interfere with the function the fertilizer dispensing apparatus 120 of the present invention. A coupler 95 transfers rotational energy from the electric motor 45 to the auger 4 which is attached to the drive shaft of the electric motor 45 and to the end of auger 4.

FIGS. 14A and 14B depict the section and off-set view of the auger housing 32, auger feeder/mount 35 and auger support 42 assembly. In this embodiment, as opposed to the manual version described in FIG. 1, in place of the manual gear box 30 is the auger support 42 onto which the wheels 115 are mounted via wheel axles 55. At the rear of the auger housing 32 is the electric motor 45 and electric motor cover 66 which protects the motor from debris and the elements. Attached to the top of the auger housing 32 is the auger feeder/mount 35 into which the dispenser body 11 is inserted. Insuring proper alignment between the auger feeder/mount 35 and the auger housing 32 is a mounting plate 50. Visible in the cutaway is the coupler 95 which couples the electric motor 45 to the auger 4.

Figure 15:
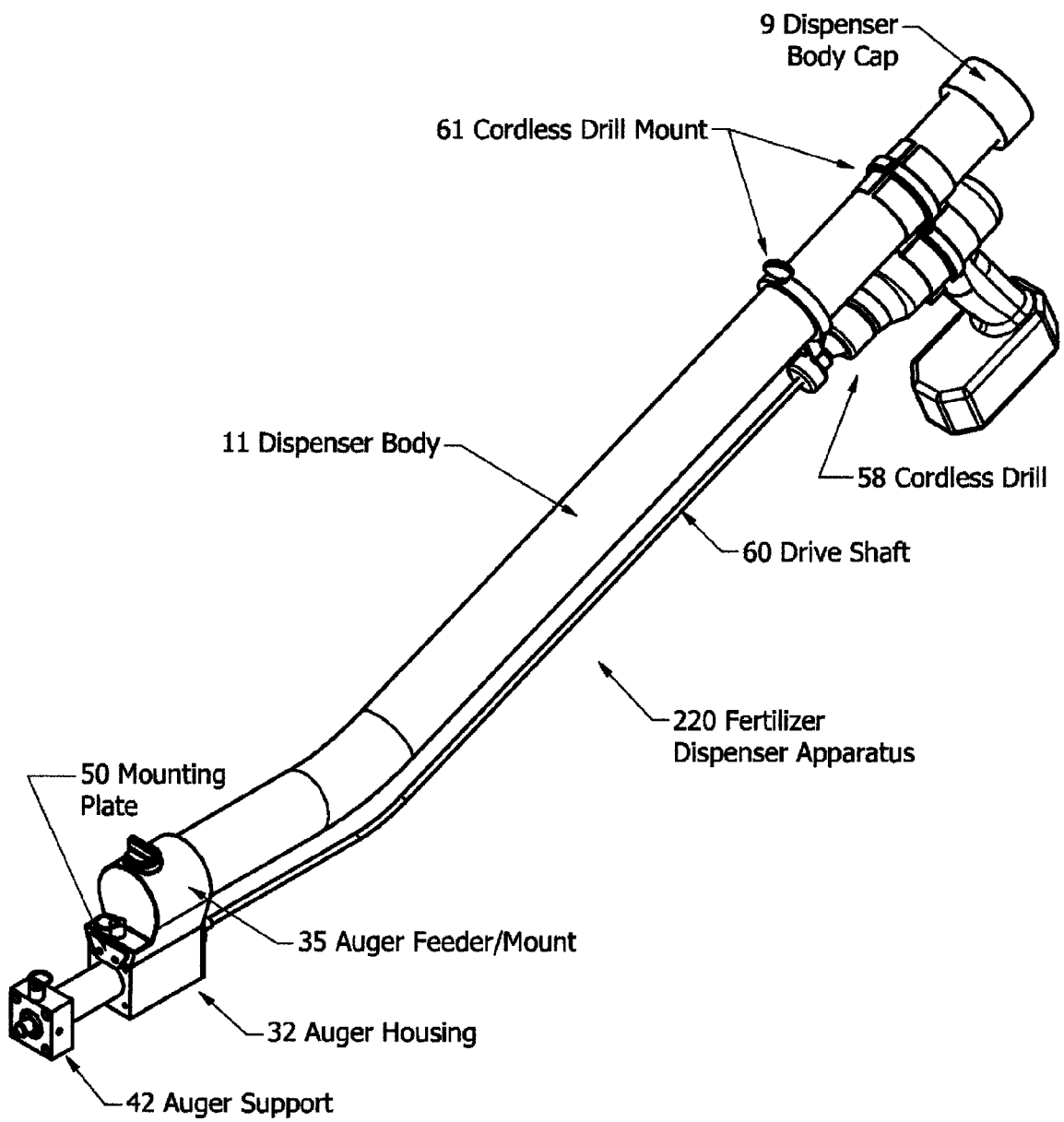
FIG. 15 depicts a third preferred embodiment of granular fertilizer dispensing apparatus of the present invention, the apparatus having an electric drill/driver attached to the body.

FIG. 15 depicts a third preferred embodiment of fertilizer dispensing apparatus of fertilizer dispensing apparatus 220 of the present invention in which in place of the trigger 17 is a cordless drill 58 mounted underneath the dispenser body 11 via a cordless drill mount 61 which attaches to the dispenser body 11 where the drive shaft 60 is connected to the drill with the drive shaft 60 connected to the auger housing 32 in place of the electric motor 45. In this embodiment, the cordless drill 58 powers the unit. The fertilizer is added to the dispenser body 11 and is fed via gravity into the auger feeder mount 35 with fertilizer only being spread when the trigger 17 is depressed. The specially contoured wheels help to coarsen the surface where the fertilizer is to be applied, making the application of the fertilizer more efficient.

Figure 16:
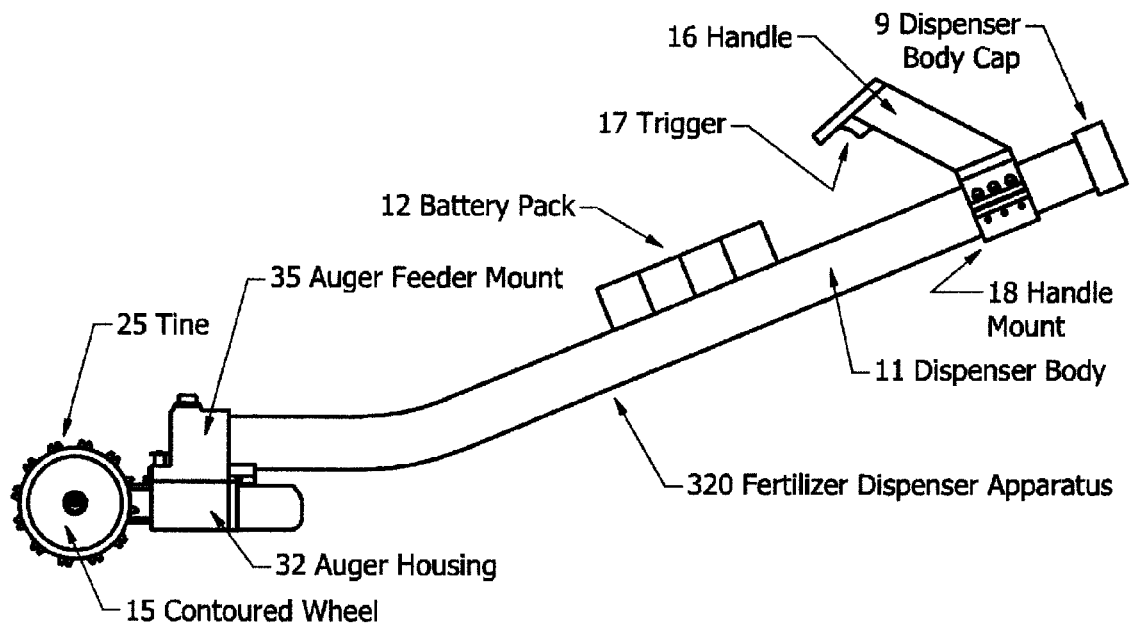
FIG. 16 depicts the front view of a fourth preferred embodiment of granular fertilizer of the present invention, the apparatus being powered by a self-contained battery pack.

FIG. 16 depicts the front view of a fourth preferred embodiment of fertilizer dispensing apparatus of fertilizer dispensing apparatus 320 of the present invention, said apparatus being powered by a self-contained battery pack. In this embodiment, along the dispenser body 11 is located battery compartments 12 which power the unit, with said battery compartments 12 preferably being removable and enabling the use the cordless drill, rechargeable style batteries instead. The fertilizer is added to the dispenser body 11 and is fed via gravity into the auger feeder mount 35 with fertilizer only being spread when the trigger 17 is depressed. The specially contoured wheels help to coarsen the surface where the fertilizer is to be applied, making the application of the fertilizer more efficient. Battery-packs differ greatly in power and weight. The battery packs offered a range between 12 and 36 volts. The lower end of this range is appropriate for smaller applications.

Figure 17:
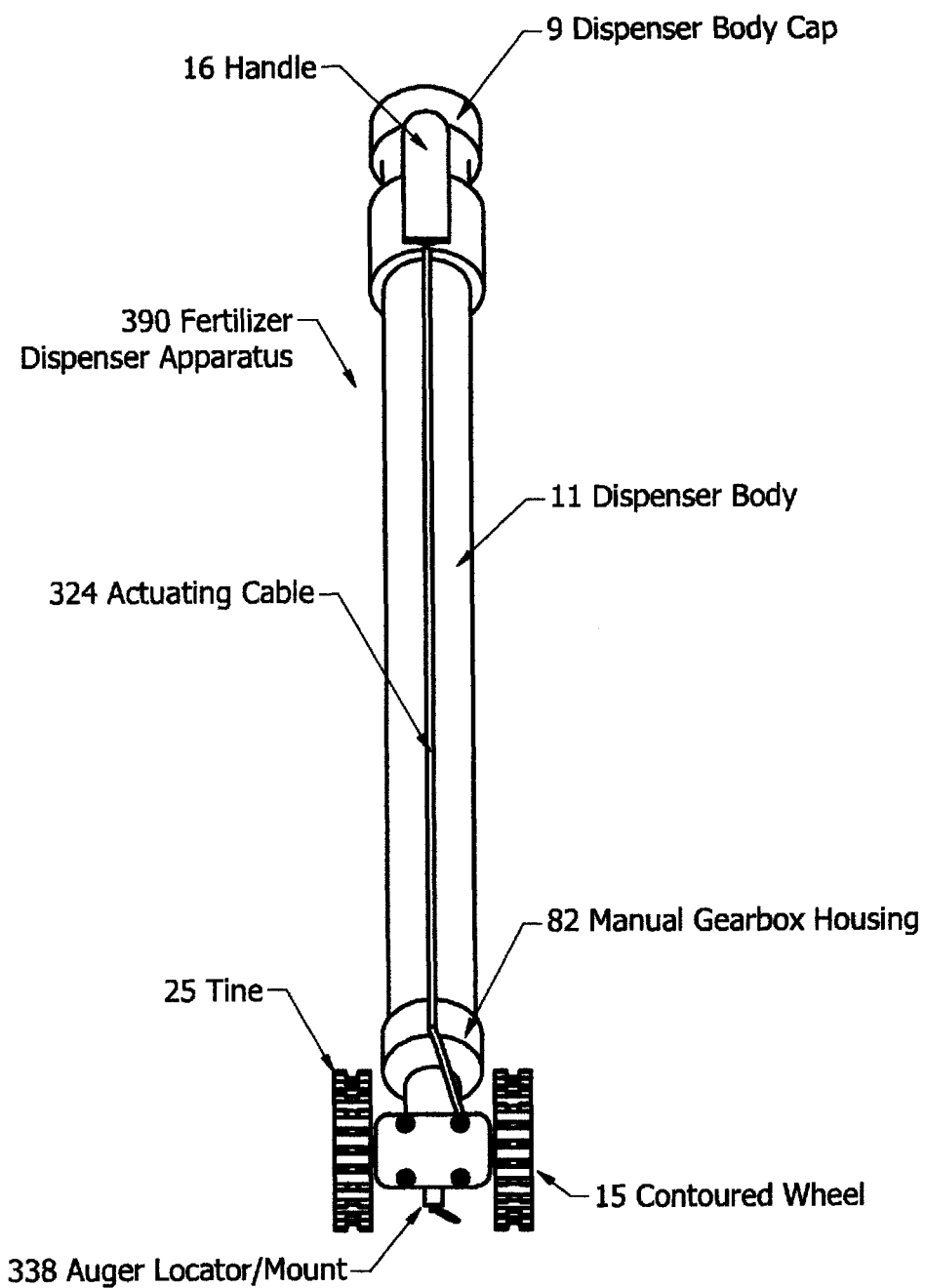
FIG. 17 depicts the front view of a fifth preferred embodiment of the granular fertilizer dispensing apparatus of the present invention with an actuating cable running from the trigger to the gear box.
Figure 18:
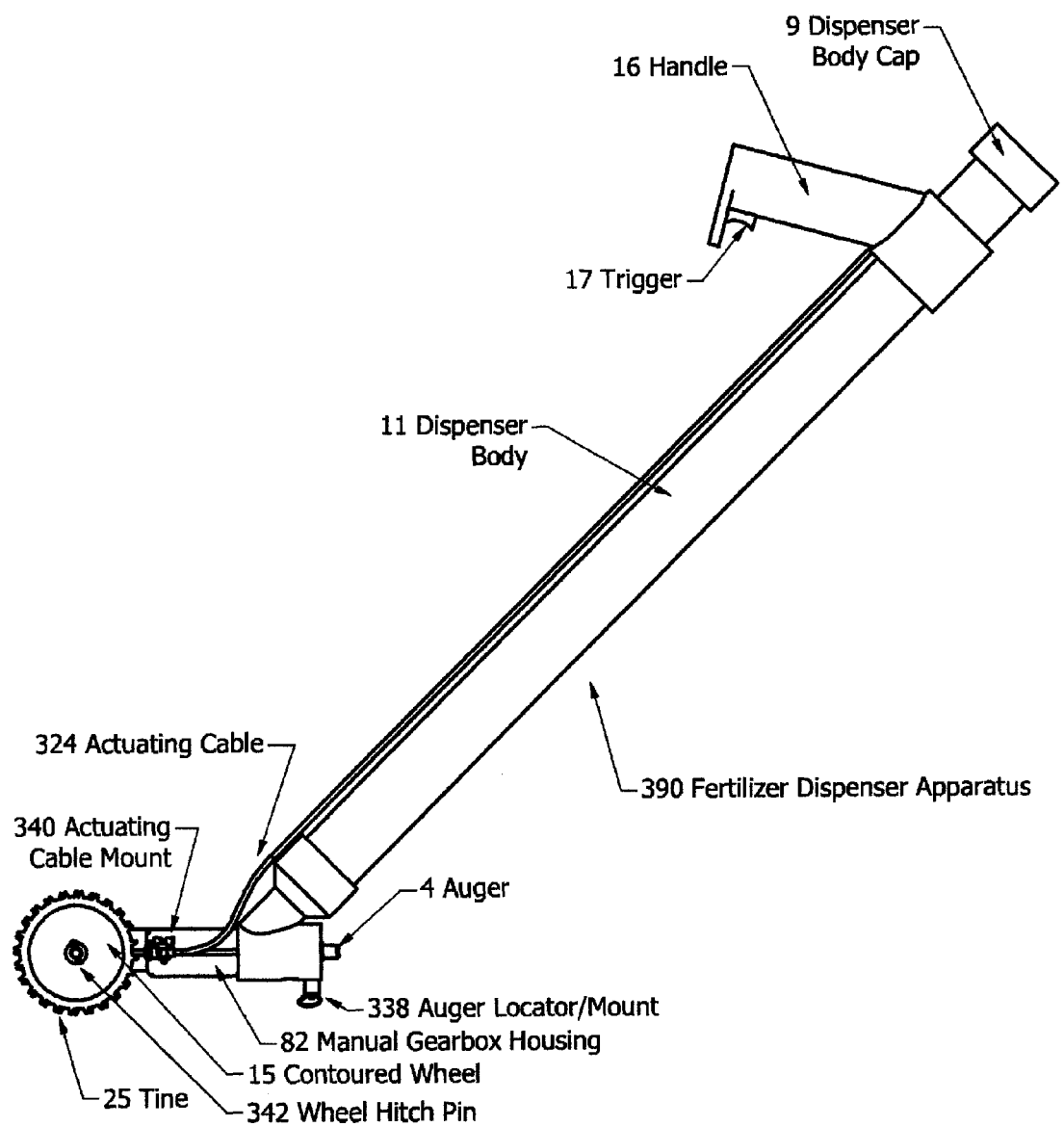
FIG. 18 depicts the side view of the fifth preferred embodiment of the granular fertilizer dispensing apparatus of FIG. 17.

FIGS. 17 and 18 depict the fifth embodiment of the manual fertilizer dispensing apparatus 390 of the present invention. Attached to the top of the dispenser body 11 is the handle 16 with trigger 17 which enables the user to operate fertilizer dispensing apparatus 390 of the present invention. Attached to the trigger 17 is an actuating cable 324 which runs the length of the dispenser body 11 and is connected to the gearbox 82. Attaching the handle 16 to the dispenser body 11 is a handle mount 18 which is a compression style mount attached via fasteners. At the base of the dispenser body is the auger/feeder mount 35 which is attached to the fertilizer dispensing apparatus 390 and houses the auger 4. The contoured wheels 15 are attached to the auger housing 32 via a wheel mount/manual gearbox drive shaft 40, which are used for mobility to coarsen the ground prior to dispensing of the fertilizer.

Figure 19A:
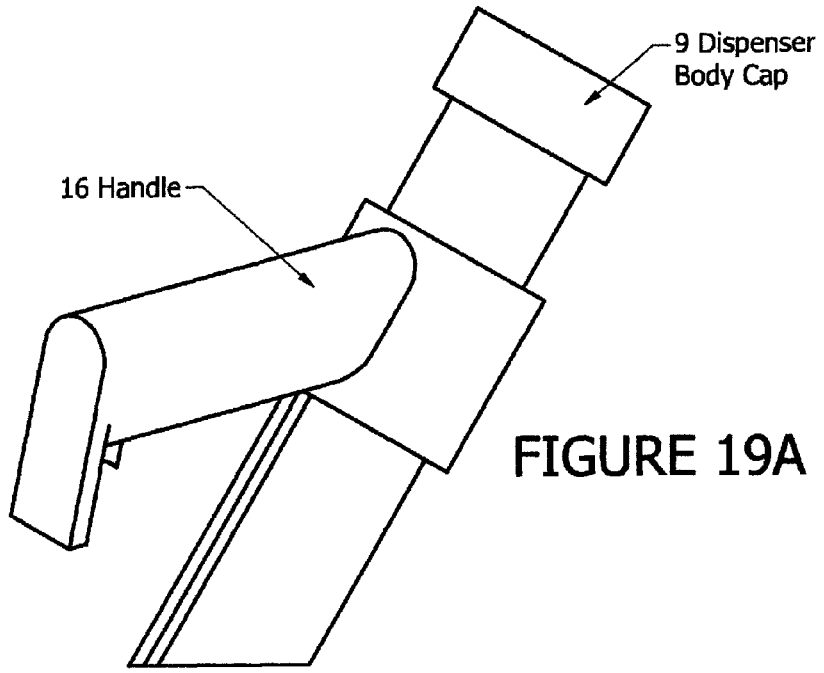
FIG. 19A depicts the handle and trigger of the fifth preferred embodiment of the granular fertilizer dispensing apparatus of FIG. 17.
Figure 19B:
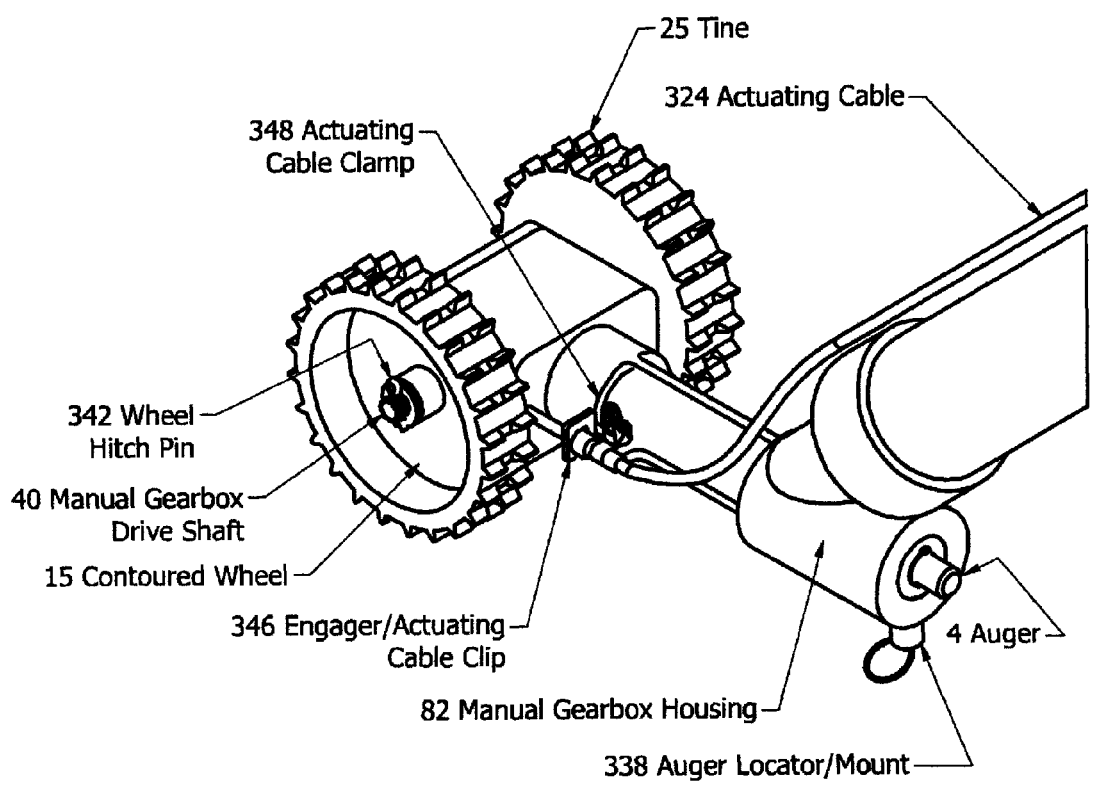
FIG. 19B depicts the wheels, and gearbox of the fifth preferred embodiment of the granular fertilizer dispensing apparatus of the present invention.

FIG. 19A depicts a perspective view of the trigger and handle as attached to the dispenser body 11. FIG. 19B depicts a perspective view of the manual embodiment of the fifth preferred embodiment in which the manual gearbox 30 with attached contoured wheels 15 is visibly attached to the dispenser body 11 via a wheel mount/manual gearbox drive shaft 40. The actuating cable 324 is connected to the gearbox 30 via actuating cable clamp 346. Also, shown is the wheel hitch pin 342 which attaches the wheel 15 to the manual gearbox 30 via drive shaft 40. The auger locator/mount 338 is also shown which holds the auger 4 in place and enables quick changes to augers of varying pitches as needed.

FIG. 19B depicts a preferred embodiment of the contoured wheel 15. Each contoured wheel 15 includes multiple rows of projections, each row including a plurality of said projections or tines. A plurality of projections extending outward from each contoured wheel 15 the tines being designed to churn the soil, either exposing the root for the fertilizer dispenser apparatus 390 to drop fertilizer onto the root or subsequently cover said root with soil. While preferably this can be accomplished with a single pass, it may be necessary for the fertilizer dispenser apparatus 390 to pass the targeted area more than one time, initially to expose the root and subsequently to cover the fertilized root.

Figure 20A:
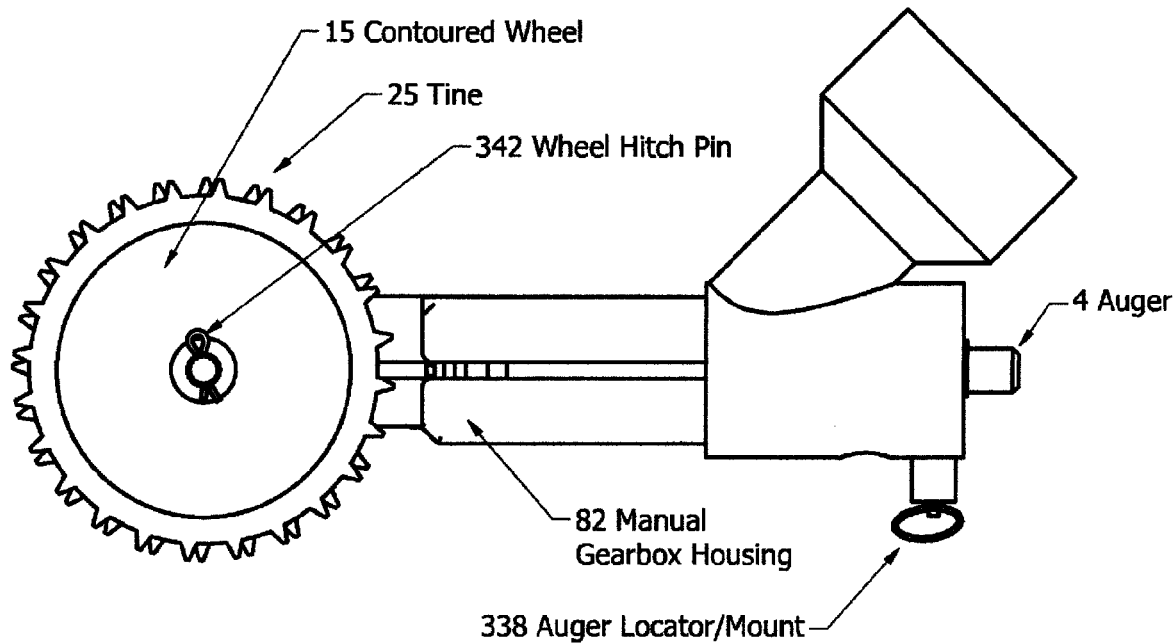
FIG. 20A depicts the side view of the gearbox, auger housing and wheels of the fifth embodiment of the granular fertilizer dispensing apparatus of the present invention.
Figure 20B:
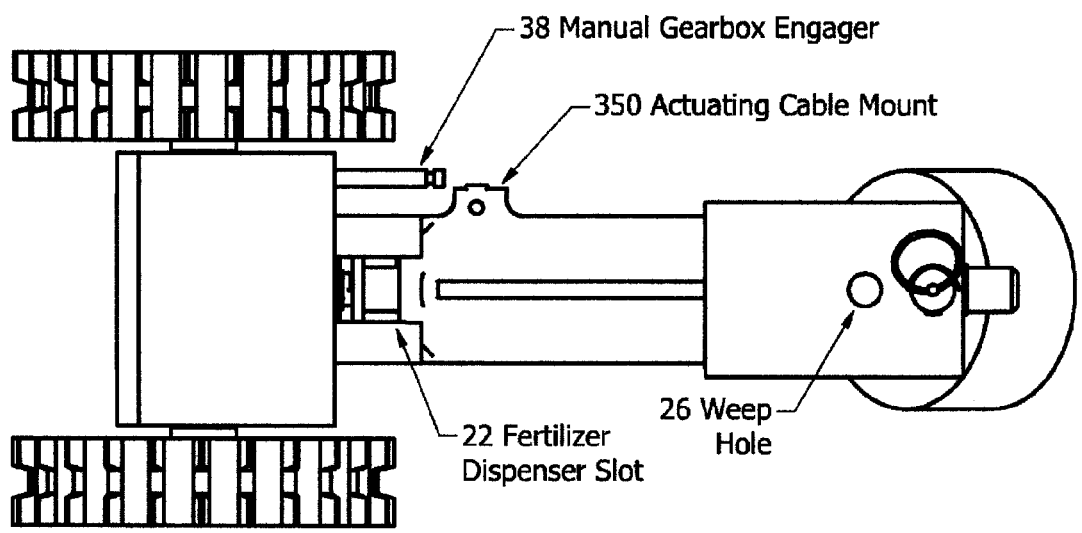
FIG. 20B depicts the underside view of the fifth preferred embodiment of the granular fertilizer dispensing apparatus of the present invention.

FIG. 20A depicts the side view of the manual gearbox housing 82. Attached to the manual gearbox housing 82 are the contoured wheels 15 attached via wheel hitch pin 342. At the rear of gearbox housing 82 is the auger locator/mount 338 which allows the user to quickly remove and replace the auger 4 with an auger of different pitch or for maintenance. FIG. 20B depicts the underside of the fertilizer dispensing apparatus of FIG. 20A. Visible, is the weep hole 26 which is located at the rear of the manual gearbox 30 which allows any excess fertilizer of other debris to fall from the apparatus and prevent any buildup which would adversely affect the operation of the unit. Disposed in the front of the fertilizer dispensing apparatus 390 is the fertilizer dispensing slot 22 from which the fertilizer is dispensed. The manual gear engager 38 is also visible which the actuating cable 324 is connected to via the actuating cable mount 350.

Figure 21:
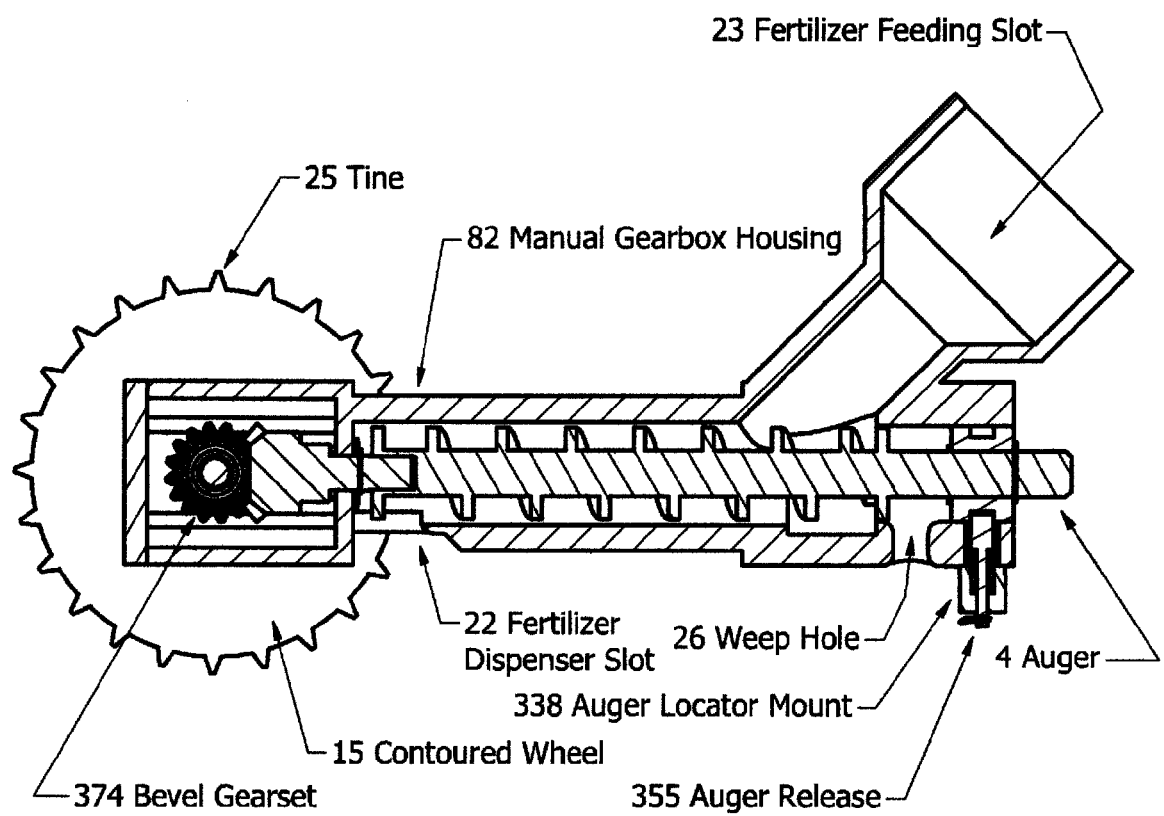
FIG. 21 depicts a cut-away view of the gearbox of the fifth embodiment of the granular fertilizer dispensing apparatus of the present invention.

FIG. 21 depicts a cutaway view of the fifth preferred embodiment of the fertilizer dispensing apparatus 390 with the auger 4 clearly visible. To release the auger 4 the auger release 355 is pulled and the auger 4 will then be able to pulled from the gearbox housing 82 from the rear. Also visible, is the bevel gearset 374 which is at the front of the gearbox 82 and connected via the wheel mount manual gearbox drive shaft 40. When dispensed, the fertilizer flows down the fertilizer feeding slot 23 and onto the auger 4 which then carries the fertilizer forward and out of the dispensing slot 22 with any excess as well as any other debris falling from the weep hole 26 located at the rear of the manual gearbox 82.

Figure 22:
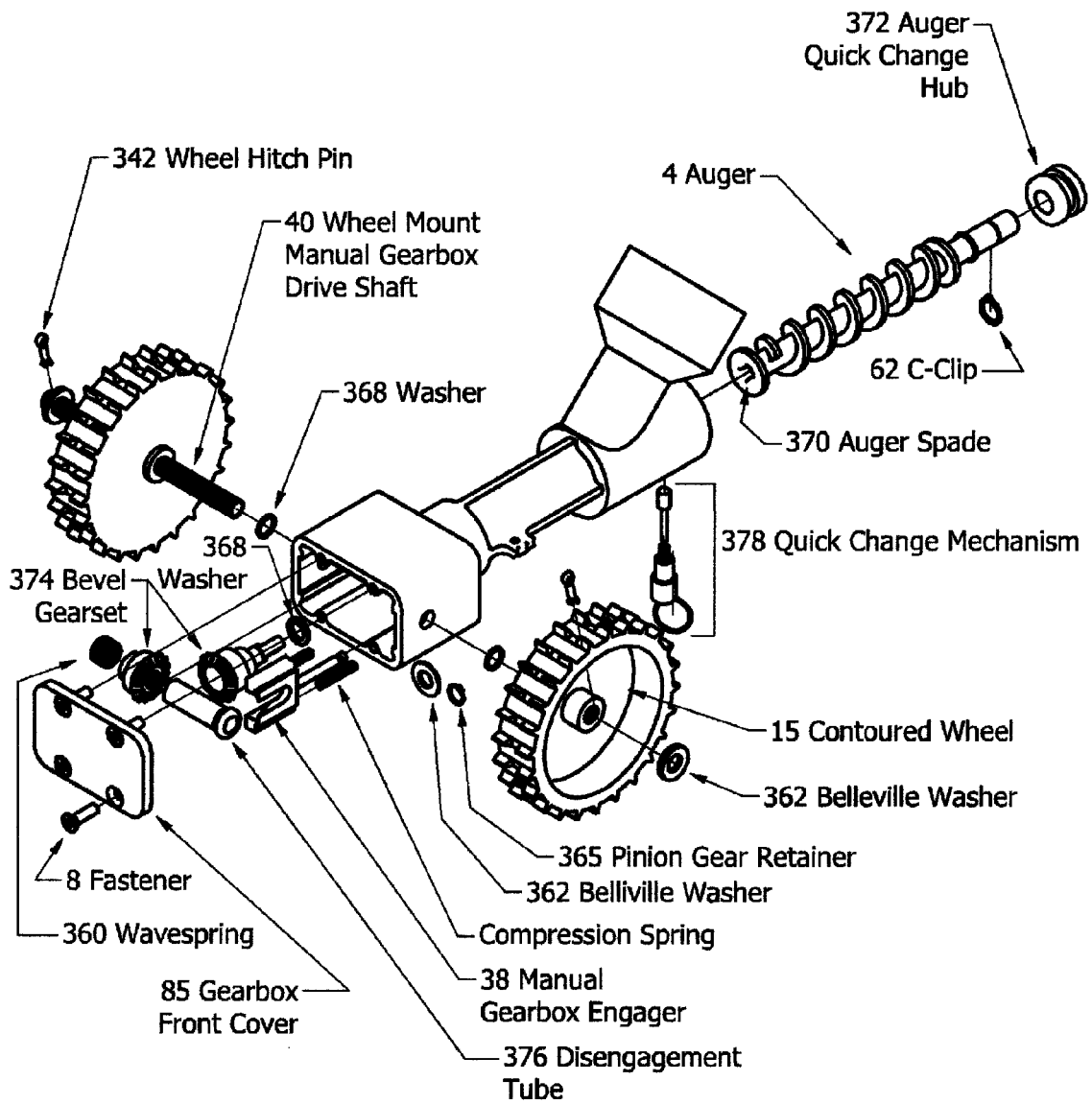
FIG. 22 depicts an exploded view of the gearbox assembly of the fifth embodiment of the manual granular fertilizer dispensing apparatus of the present invention.

FIG. 22 depicts a detailed assembly view of the manual gear box 30 and the auger housing 32 of the fertilizer dispensing apparatus 390. Inside the manual gearbox 30 is the wheel mount/drive shaft 40 upon which the bevel gearset 374 is attached, which turns the auger 4 when engaged via the actuating cable 324 which, in turn, actuates the engagement tube 376 which is connected to the gearbox engager 38, collapsing the compression springs that are interior to the manual gearbox engager 38, as well as allowing the wave spring 360 to decompress and extend, causing the bevel gearset 374 to connect, dispensing fertilizer. Locating the auger 4 in the auger housing 32 is the recessed spade interface of the auger 4, which mates with the spade segment of the bevel gearset. At the rear of the auger 4 is the auger quick change hub 372 which has a channel in which the quick change mechanism 378 engages, holding the auger securely in the housing 82.

In this preferred embodiment the manual gearbox is an integral part of the manual gearbox housing. It is one piece and molded. The manual gearbox 30 is attached to the end of the assembly by four fasteners with the auger 4 being positioned inside manual housing 82. Forward and rearward motion of the wheels 15 turns the gearbox 30 and when the trigger 17 is pulled, the gear box engager 38 engages the gears, turning the auger 4 and dispensing a metered amount of fertilizing agent. At the front of the gear box 82 is the gear box front cover 85 which is secured into place via four fasteners 8 and allows access to the bevel gearset 374 as well as the gearbox engager 38 and the engagement tube 376.

Figure 23:
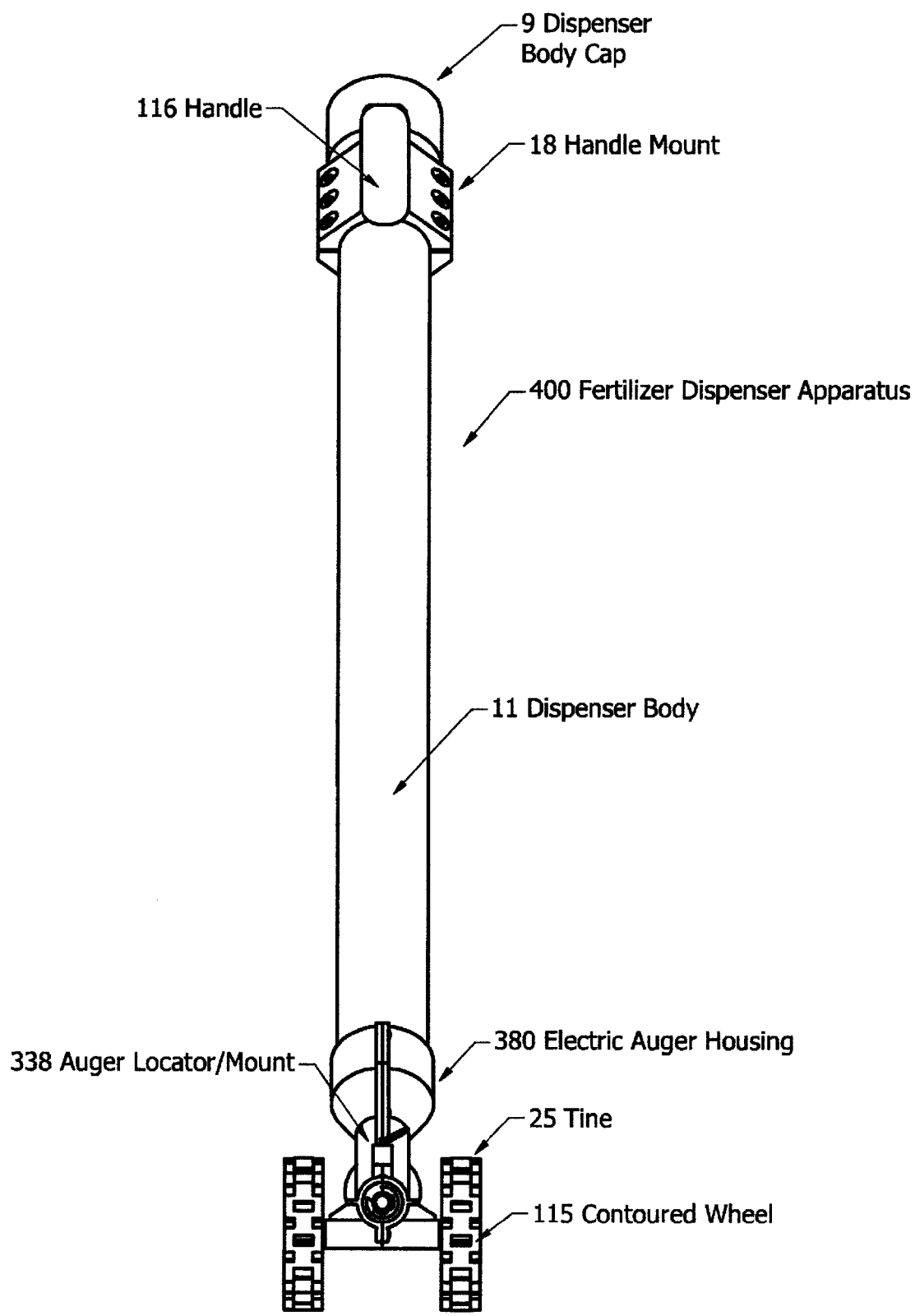
FIG. 23 depicts front view of the sixth embodiment of the granular fertilizer dispensing apparatus of the present invention, this apparatus being powered via battery.
Figure 24:
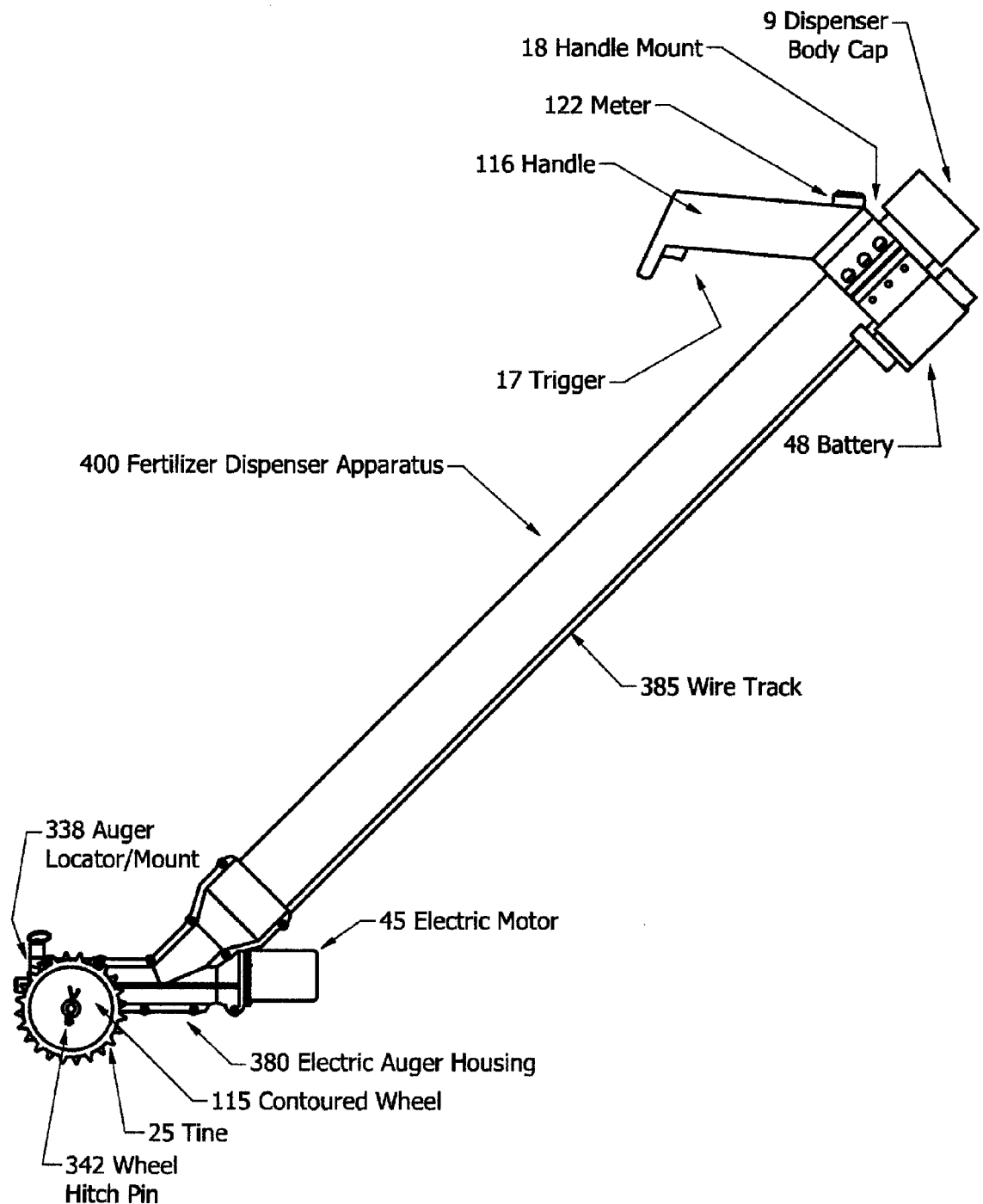
FIG. 24 depicts the side view of the sixth embodiment of the granular fertilizer dispensing apparatus of the present invention, this apparatus being powered via battery of the present invention.
Figure 26:
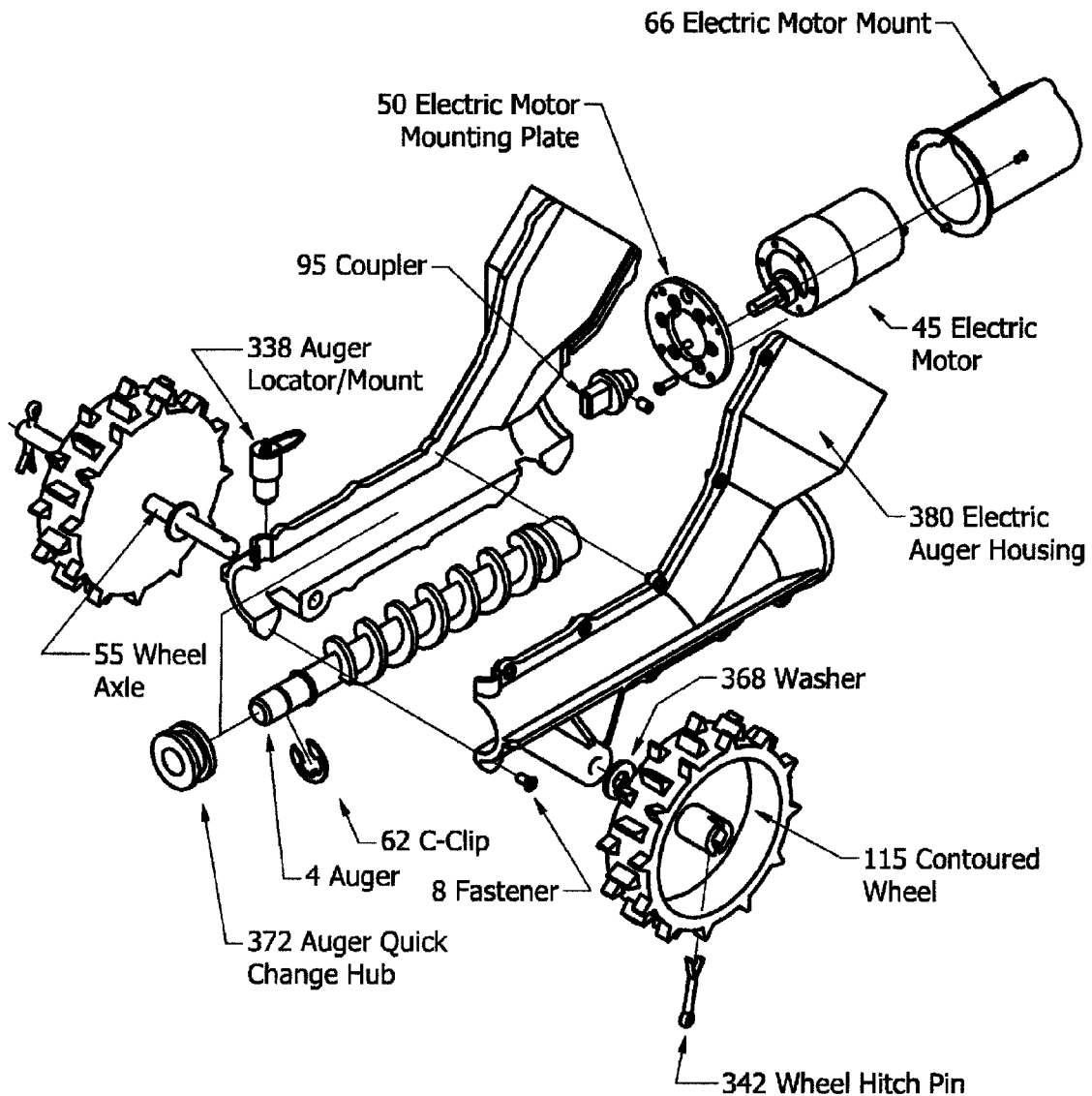
FIG. 26 depicts an exploded view of the sixth embodiment of the granular fertilizer dispensing apparatus of the present invention, this apparatus being power via battery.

FIGS. 23 and 24 depict the front and profile view of the power version of the fertilizer dispensing apparatus 400 of the present invention, and FIGS. 25A, 25C, and 26 is an assembly view of the power version of the fertilizer dispensing apparatus 400. The auger housing 32 which is mounted to the auger feeder/mount 35 is shown, which is mounted to the end of the dispenser body 11. The auger housing 32 is comprised of two halves which are held together via multiple fasteners 8. The rear of the housing 32 is attached the electric motor 45 with cover 66. The electric motor 45 when the trigger 17 is depressed, the electric motor turns the auger 4. In this embodiment, there is no gearbox connected to the wheels. The quick change mechanism 378 is at the front of this embodiment, allowing the auger 4 to be removed from the front of the unit. At the opposite end of the dispenser body 11 is the handle 116, which is mounted to a compression fit mount 18 via six fasteners. FIG. 25B is the auger 4 with quick change hub 372 and c-clip 62 clearly shown. A rechargeable battery 48 is attached behind the handle with a wire track 385 running down to the electric motor 45. The rechargeable battery 48 is used to actuate the electric motor 45 which is mounted to the rear of the auger housing 32. The dispenser body cap 9 is positioned just behind the handle 116 and is used for loading the fertilizer into the fertilizer dispensing apparatus 400 of the present invention.

The meter 122 as depicted in FIG. 10 is positioned in the handle 116 of the fertilizer dispensing apparatus of the present invention. The meter 122 is preferably either a volume flow meter or a mass flow meter. The control mechanism 17 is cooperatively engaged with a main body 11. The control mechanism 17 is also cooperatively engaged with the meter 122. The meter 122 is a mass or volume flow meter displaying a dosage of fertilizer being dispensed. The user pinpoints a location where said dosage of fertilizer is to be dispensed by positioning said fertilizer dispensing apparatus 400. The user uses the set point stem setter to advise the apparatus the dosage of fertilizer to be dispensed to the location selected. The control mechanism 17 and the flow meter 122 enable the user to control the dosage of fertilizer dispensed.

FIGS. 27A and 27B, 27C and 27D, and 27E and 27F depict three augers having varying pitch. FIGS. 27A and 27B depict a first and longer auger pitch 4A, FIGS. 27C and 27D depict a second and narrower auger pitch 4B, and FIGS. 27E and 27F depict a third and smallest auger pitch 4C. The auger pitch 4C enables the slowest rate of fertilizer to be applied through the granular fertilizer apparatus of the present invention.

The fertilizer dispenser apparatus of the present invention may be manual or powered as described above. In either event, the fertilizer dispenser apparatus is used by an operator that walks behind or alongside of the unit, deciding how much fertilizer to apply at any particular location.

In one preferred embodiment, the electric motor 45 has a variable speed type. This enables a pre-programmable system for the user to set the meter for various amounts of fertilizer to be dispensed, allowing different amounts to be dispensed when the trigger 17 is pressed.

Further, to allow for ease during usage in applications when the device would need to be used underneath foliage, removable fenders could be used so as to prevent any damage to sensitive foliage.

The longer the trigger is held, the more fertilizer is dispensed. While the fertilizer is being dispensed, the unit is moved in a manner so as to fertilize the area desired. After the proper dosage of fertilizer has been applied, the unit is manipulated in a similar back and forth motion that was previously performed to coarsen the surface prior to application.

The granular fertilizer dispensing apparatus of the present invention provides a user with a clear view of said root system within said surface area to be treated to monitor apparatus operation. The granular fertilizer dispensing apparatus of the present invention can accurately meter the rate to dispense onto an area as small as one square inch (7 square centimeters).

Throughout this application, various patents and applications are referenced by number and inventor. The disclosures of these documents in their entireties are hereby incorporated by reference into this specification in order to more fully describe the state of the art to which this invention pertains.

It is evident that many alternatives, modifications, and variations of the granular fertilizer dispenser apparatus 20 of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A granular fertilizer dispensing apparatus for dispensing a granular fertilizer onto a surface, comprising:
   a housing having a first end, a second end, an enclosed tubular bore that extends longitudinally between the first end and the second end of the housing, a first opening that faces generally upward and is positioned adjacent to the first end of the housing, and a second opening that faces generally downward toward the surface and is positioned adjacent to the second end of the housing, wherein the enclosed tubular bore is free from openings between the first opening and the second opening;
   one or more wheels that are connected to the housing for supporting the housing with respect to the surface;
   a handle that is configured to be grasped by a user to cause movement of the housing relative to the surface;
   an elongate tubular body having a first end that is connected to the housing and a second end that is connected to the handle; and
   an auger having a substantially constant pitch length, housed within the enclosed tubular bore of the housing, and connected to the one or more wheels, wherein rotation of the one or more wheels causes rotation of the auger, wherein rotation of the auger within the enclosed tubular bore of the housing transports the granular fertilizer along the enclosed tubular bore of the housing from the first opening of the housing to the second opening of the housing to control an amount of the granular fertilizer that is dispensed from the second opening of the housing onto the surface,
   wherein the enclosed tubular bore of the housing has a longitudinal length that is greater than twice the pitch length of the auger.

2. The granular fertilizer dispensing apparatus of claim 1, wherein the handle is rigidly connected to the housing.

3. The granular fertilizer dispensing apparatus of claim 1, wherein the elongate tubular body is adapted to store the granular fertilizer and the elongate tubular body is connected to the housing for supplying the granular fertilizer to the first opening of the housing.

4. The granular fertilizer dispensing apparatus of claim 1, further comprising:
   a gearbox connected to the one or more wheels and the auger and operable to disconnect rotation of the auger in response to rotation of the one or more wheels.

5. The granular fertilizer dispensing apparatus of claim 4, wherein the gearbox includes an engaging gear that is movable between an engaged position, in which the gearbox is connected to the auger such that rotation of the one or more wheels causes rotation of the auger, and a disengaged position, in which the gearbox is disconnected from the auger such that rotation of the one or more wheels does not cause rotation of the auger.

6. The granular fertilizer dispensing apparatus of claim 5, further comprising:
a trigger that is operatively connected to the engaging gear for causing the engaging gear to move between the engaged position and the disengaged position.

7. The granular fertilizer dispensing apparatus of claim 1, wherein the one or more wheels includes a first wheel and a second wheel, wherein the first wheel and the second wheel each include a plurality of tines that are equally spaced around a circumference of the first wheel and the second wheel, respectively, for disrupting the surface.

8. The granular fertilizer dispensing apparatus of claim 1, wherein the second opening of the housing has a longitudinal length that is less than twice the pitch length of the auger.

9. The granular fertilizer dispensing apparatus of claim 1, wherein the first opening of the housing has a longitudinal length that is less than twice the pitch length of the auger.

10. A granular fertilizer dispensing apparatus for dispensing a granular fertilizer onto a surface, comprising:
a housing having a first end, a second end, an enclosed tubular bore that extends longitudinally between the first end and the second end of the housing, a first opening that faces generally upward and is positioned adjacent to the first end of the housing, and a second opening that faces generally downward toward the surface and is positioned adjacent to the second end of the housing, wherein the housing includes a weep hole that faces generally downward toward the surface and is positioned longitudinally between the first end and the first opening of the housing, and the enclosed tubular bore is free from openings between the first opening and the second opening;
one or more wheels that are connected to the housing for supporting the housing with respect to the surface;
a handle that is configured to be grasped by a user to cause movement of the housing relative to the surface; and
an auger having a substantially constant pitch length, housed within the enclosed tubular bore of the housing, and connected to the one or more wheels, wherein rotation of the one or more wheels causes rotation of the auger, wherein rotation of the auger within the enclosed tubular bore of the housing transports the granular fertilizer along the enclosed tubular bore of the housing from the first opening of the housing to the second opening of the housing to control an amount of the granular fertilizer that is dispensed from the second opening of the housing onto the surface,
wherein the enclosed tubular bore of the housing has a longitudinal length that is greater than twice the pitch length of the auger.

11. A granular fertilizer dispensing apparatus for dispensing a granular fertilizer onto a surface, comprising:
a housing having a first end, a second end, an enclosed tubular bore that extends between the first end and the second end in a longitudinal direction, a first opening that faces generally upward away from the surface, and a second opening that faces generally downward toward the surface, wherein the enclosed tubular bore is free from openings between the first opening and the second opening;
one or more wheels that are connected to the housing for supporting the housing with respect to the surface;
a handle that is configured to be grasped by a user to cause movement of the housing relative to the surface;
a body having a first end that is connected to the housing and a second end that is connected to the handle; and
an auger having a pitch length, at least partially housed within the enclosed tubular bore of the housing, and connected to an electric motor, wherein operation of the electric motor causes rotation of the auger, wherein rotation of the auger within the enclosed tubular bore of the housing transports the granular fertilizer along the enclosed tubular bore of the housing from the first opening of the housing to the second opening of the housing to control an amount of the granular fertilizer that is dispensed from the second opening of the housing onto the surface,
wherein the enclosed tubular bore of the housing has a longitudinal length that is greater than twice the pitch length of the auger.

12. The granular fertilizer dispensing apparatus of claim 11, further comprising:
a trigger that is operatively connected to the electric motor for causing operation of the electric motor.

13. The granular fertilizer dispensing apparatus of claim 11, further comprising:
a weep hole formed in the housing that faces generally downward toward the surface and is positioned longitudinally between the first end and the first opening.

14. A granular fertilizer dispensing apparatus for dispensing a granular fertilizer onto a surface, comprising:
a housing having a first end, a second end, an enclosed tubular bore that extends between the first end and the second end in a longitudinal direction, a first opening that faces generally upward away from the surface, and a second opening that faces generally downward toward the surface, wherein the enclosed tubular bore is free from openings between the first opening and the second opening;
a handle that is configured to be grasped by a user to cause movement of the housing relative to the surface;
a body having a first end that is connected to the housing and a second end that is connected to the handle;
a wheel having an axle for supporting the housing with respect to the surface, wherein the axle of the wheel extends at least partially through at least one of either the housing or the body; and
an auger having a pitch length and housed within the enclosed tubular bore of the housing, wherein rotation of the auger within the enclosed tubular bore of the housing transports the granular fertilizer along the enclosed tubular bore of the housing from the first opening to the second opening of the enclosed tubular bore to control an amount of the granular fertilizer that is dispensed from the second opening of the enclosed tubular bore onto the surface,
wherein the enclosed tubular bore has a longitudinal length that is greater than twice the pitch length of the auger.

15. The granular fertilizer dispensing apparatus of claim 14, further comprising:
a gearbox connected to the wheel and the auger for rotating the auger in response to rotation of the wheel.

16. The granular fertilizer dispensing apparatus of claim 15, wherein the gearbox includes an engaging gear that is movable between an engaged position, in which the gearbox is connected to the auger such that rotation of the wheel causes rotation of the auger, and a disengaged position, in which the gearbox is disconnected from the auger such that rotation of the wheel does not cause rotation of the auger.

17. The granular fertilizer dispensing apparatus of claim 16, further comprising:
   a trigger that is operatively connected to the engaging gear for causing the engaging gear to move between the engaged position and the disengaged position.

18. The granular fertilizer dispensing apparatus of claim 14, further comprising:
   an electric motor connected to the auger for rotating the auger.

19. The granular fertilizer dispensing apparatus of claim 18, further comprising:
   a trigger that is operatively connected to the electric motor for causing operation of the electric motor.

* * * * *